United States Patent
Kourtakis et al.

(10) Patent No.: US 9,240,586 B2
(45) Date of Patent: Jan. 19, 2016

(54) COMPOSITIONS, LAYERINGS, ELECTRODES AND METHODS FOR MAKING

(71) Applicant: E I DU PONT DE NEMOURS AND COMPANY, Wilmington, DE (US)

(72) Inventors: Kostantinos Kourtakis, Media, PA (US); Brent Wise, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 387 days.

(21) Appl. No.: 13/743,868

(22) Filed: Jan. 17, 2013

(65) Prior Publication Data
US 2013/0181678 A1     Jul. 18, 2013

Related U.S. Application Data

(60) Provisional application No. 61/587,858, filed on Jan. 18, 2012.

(51) Int. Cl.
*H01M 4/133* (2010.01)
*H01M 10/44* (2006.01)
*H01M 4/13* (2010.01)
*H01M 4/36* (2006.01)
*H01M 4/38* (2006.01)
*H01M 4/587* (2010.01)
*H01M 4/62* (2006.01)

(52) U.S. Cl.
CPC ............... *H01M 4/133* (2013.01); *H01M 4/13* (2013.01); *H01M 4/362* (2013.01); *H01M 4/366* (2013.01); *H01M 4/38* (2013.01); *H01M 4/587* (2013.01); *H01M 4/62* (2013.01); *H01M 10/44* (2013.01); *Y02E 60/122* (2013.01)

(58) Field of Classification Search
CPC ..................................................... H01M 4/133
USPC ............................................................ 320/128
See application file for complete search history.

(56) References Cited

U.S. PATENT DOCUMENTS

| | | | |
|---|---|---|---|
| 6,153,332 A | 11/2000 | Nishida et al. | |
| 6,518,365 B1 | 2/2003 | Powell et al. | |
| 2007/0287060 A1 | 12/2007 | Naoi et al. | |
| 2010/0035162 A1 | 2/2010 | Chiga et al. | |
| 2010/0068592 A1* | 3/2010 | Akiyama et al. | 429/33 |
| 2010/0068622 A1 | 3/2010 | Wang et al. | |
| 2010/0075226 A1 | 3/2010 | Pham et al. | |
| 2010/0291442 A1 | 11/2010 | Wang et al. | |

(Continued)

FOREIGN PATENT DOCUMENTS

JP          11339808 A      12/1999

OTHER PUBLICATIONS

U.S. Appl. No. 61/587,805, Kourtakis et al., Compositions, Electrodes & Methods of Making, Filed Jan. 18, 2012.

(Continued)

*Primary Examiner* — Thuan Do

(57) ABSTRACT

There is a composition comprising 1 to 17.5 wt. % ionomer composition comprising hydrocarbon ionomer and 50 to 99 wt. % carbon-sulfur composite made from carbon powder having a surface area of about 50 to 4,000 square meters per gram and a pore volume of about 0.5 to 6 cubic centimeters per gram. The composite has 5 to 95 wt. % sulfur compound. There is also a layering comprising a plurality of coatings. Respective coatings in the plurality of coatings comprise respective compositions. The respective coatings comprise at least one ionomer composition comprising hydrocarbon ionomer and at least one carbon-sulfur composite of carbon powder and sulfur compound. There are also electrodes comprising the composition or layering and methods of using such in cells.

8 Claims, 3 Drawing Sheets

(56) References Cited

U.S. PATENT DOCUMENTS

2011/0052998 A1  3/2011  Liang et al.
2012/0082901 A1* 4/2012  Schmidt et al. ............... 429/308

OTHER PUBLICATIONS

Naoi et al., A New Energy Storage Material: Organosulfur Compounds Based on Multiple Sulfur-Sulfur Bonds, J Electrochem Soc., vol. 144, No. 6, pp. L170-172, 1997.

Brunauer et al, Adsorption of Gasses in Multimolecular Layers, J Amer Chem Soc., vol. 60, pp. 309-319, 1938.

Barret et al., The Determination of Pore Volume and Area Distributions in Porous Substances, J Amer Chem Soc., vol. 73, pp. 373-380, 1951.

Espacenet.Com, Machine Translation of Abstract for JP11-339808A.

* cited by examiner

COMPOSITIONS, LAYERINGS, ELECTRODES AND METHODS FOR MAKING

CROSS-REFERENCE TO RELATED APPLICATIONS

This application claims priority on and the benefit of the filing date of U.S. Provisional Application Nos. 61/587,858, filed on Jan. 18, 2012, and U.S. Provisional Application Nos. 61/602,153, filed on Feb. 23, 2012, the entirety of which is herein incorporated by reference.

BACKGROUND OF THE INVENTION

There is significant interest in lithium sulfur (i.e., "Li—S") batteries as potential portable power sources for their applicability in different areas. These areas include emerging areas, such as electrically powered automobiles and portable electronic devices, and traditional areas, such as car ignition batteries. Li—S batteries offer great promise in terms of cost, safety and capacity, especially compared with lithium ion battery technologies not based on sulfur. For example, elemental sulfur is often used as a source of electroactive sulfur in a Li—S cell of a Li—S battery. The theoretical charge capacity associated with electroactive sulfur in a Li—S cell based on elemental sulfur is about 1,672 mAh/g S. In comparison, a theoretical charge capacity in a lithium ion battery based on a metal oxide is often less than 250 mAh/g metal oxide. For example, the theoretical charge capacity in a lithium ion battery based on the metal oxide species $LiFePO_4$ is 176 mAh/g.

A Li—S battery includes one or more electrochemical voltaic Li—S cells which derive electrical energy from chemical reactions occurring in the cells. A cell includes at least one positive electrode. When a new positive electrode is initially incorporated into a Li—S cell, the electrode includes an amount of sulfur compound incorporated within its structure. The sulfur compound includes potentially electroactive sulfur which can be utilized in operating the cell. A negative electrode in a Li—S cell commonly includes lithium metal. In general, the cell includes a cell solution with one or more solvents and electrolytes. The cell also includes one or more porous separators for separating and electrically isolating the positive electrode from the negative electrode, but permitting diffusion to occur between them in the cell solution. Generally, the positive electrode is coupled to at least one negative electrode in the same cell. The coupling is commonly through a conductive metallic circuit.

Li—S cell configurations also include, but are not limited to, those having a negative electrode which initially does not include lithium metal, but includes another material. Examples of these materials are graphite, silicon-alloy and other metal alloys. Other Li—S cell configurations include those with a positive electrode incorporating a lithiated sulfur compound, such as lithium sulfide ($Li_2S$).

The sulfur chemistry in a Li—S cell involves a related series of sulfur compounds. During a discharge phase in a Li—S cell, lithium is oxidized to form lithium ions. At the same time larger or longer chain sulfur compounds in the cell, such as $S_8$ and $Li_2S_8$, are electrochemically reduced and converted to smaller or shorter chain sulfur compounds. In general, the reactions occurring during discharge may be represented by the following theoretical discharging sequence of the electrochemical reduction of elemental sulfur to form lithium polysulfides and lithium sulfide:

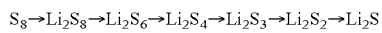

During a charge phase in a Li—S cell, a reverse process occurs. The lithium ions are drawn out of the cell solution. These ions may be plated out of the solution and back to a metallic lithium negative electrode. The reactions may be represented, generally, by the following theoretical charging sequence representing the electrooxidation of the various sulfides to elemental sulfur:

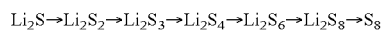

A common limitation of previously-developed Li—S cells and batteries is capacity degradation or capacity "fade". Capacity fade is associated with coulombic efficiency, the fraction or percentage of the electrical charge stored by charging that is recoverable during discharge. It is generally believed that capacity fade and coulombic efficiency are due, in part, to sulfur loss through the formation of certain soluble sulfur compounds which "shuttle" between electrodes in a Li—S cell and react to deposit on the surface of a negative electrode. It is believed that these deposited sulfides can obstruct and otherwise foul the surface of the negative electrode and may also result in sulfur loss from the total electroactive sulfur in the cell. The formation of anode-deposited sulfur compounds involves complex chemistry which is not completely understood.

In addition, low coulombic efficiency is another common limitation of Li—S cells and batteries. A low coulombic efficiency can be accompanied by a high self-discharge rate. It is believed that low coulombic efficiency is also a consequence, in part, of the formation of the soluble sulfur compounds which shuttle between electrodes during charge and discharge processes in a Li—S cell.

Some previously-developed Li—S cells and batteries have utilized high loadings of sulfur compound in their positive electrodes in attempting to address the drawbacks associated with capacity degradation and anode-deposited sulfur compounds. However, simply utilizing a higher loading of sulfur compound presents other difficulties, including a lack of adequate containment for the entire amount of sulfur compound in the high loading. Furthermore, positive electrodes formed using these compositions tend to crack or break. Another difficulty may be due, in part, to the insulating effect of the higher loading of sulfur compound. The insulating effect may contribute to difficulties in realizing the full capacity associated with all the potentially electroactive sulfur in the high loading of sulfur compound in a positive electrode of these previously-developed Li—S cell and batteries.

Conventionally, the lack of adequate containment for a high loading of sulfur compound has been addressed by utilizing higher amounts of binder in compositions incorporated into these positive electrodes. However, a positive electrode incorporating a high binder amount tends to have a lower sulfur utilization which, in turn, lowers the effective maximum discharge capacity of the Li—S cells with these electrodes.

Li—S cells and batteries are desirable based on the high theoretical capacities and high theoretical energy densities of the electroactive sulfur in their positive electrodes. However, attaining the full theoretical capacities and energy densities remains elusive. Furthermore, as mentioned above, the sulfide shuttling phenomena present in Li—S cells (i.e., the movement of polysulfides between the electrodes) can result in relatively low coulombic efficiencies for these electrochemical cells; and this is typically accompanied by undesirably high self-discharge rates. In addition, the concomitant limitations associated with capacity degradation, anode-deposited sulfur compounds and the poor conductivities intrinsic to sulfur compound itself, all of which are associated with previously-developed Li—S cells and batteries, limits the application and commercial acceptance of Li—S batteries as power sources.

Given the foregoing, what are needed are Li—S cells and batteries without the above-identified limitations of previously-developed Li—S cells and batteries.

BRIEF SUMMARY OF THE INVENTION

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by providing hydrocarbon ionomer compositions comprising hydrocarbon ionomer and carbon-sulfur (i.e., C—S) composite, and hydrocarbon ionomer-containing structures, such as layerings, relating to positive electrodes for Li—S cells and batteries. In addition, hydrocarbon ionomer positive electrodes incorporating the hydrocarbon ionomer compositions and/or layerings are also provided as well as associated methods of making and methods of using. Examples of various types and combinations of hydrocarbon ionomer compositions, layerings and positive electrodes which may be utilized are described below in the Detailed Description. The hydrocarbon ionomer compositions, layerings and positive electrodes provide Li—S cells with high coulombic efficiencies. In some embodiments, the hydrocarbon ionomer compositions, layerings and positive electrodes also provide Li—S cells with high maximum discharge capacities as well as high coulombic efficiencies, and without the above-identified limitations of previously-developed Li—S cells and batteries.

Hydrocarbon ionomer compositions, layerings and positive electrodes, according to the principles of the invention, provide Li—S cells with surprisingly high coulombic efficiencies and very high ratios of discharge to charge capacity. While not being bound by any particular theory, it is believed that the hydrocarbon ionomer in the compositions, layerings and positive electrodes suppresses the shuttling of soluble sulfur compounds and their arrival at negative electrodes in the Li—S cells. This reduces capacity fade through sulfur loss in the cells. Furthermore, low sulfur utilization and high discharge capacity degradation are avoided in these cells.

These and other objects are accomplished by the hydrocarbon ionomer compositions, layerings and positive electrodes, methods for making such and methods for using such, in accordance with the principles of the invention.

According to a first principle of the invention, there is a composition comprising ionomer composition and carbon-sulfur composite. The composition may comprise about 1 to 17.5 wt. % ionomer composition comprising hydrocarbon ionomer. The composition may about 1 to 99 wt. % carbon-sulfur composite. The carbon-sulfur composite may comprise carbon powder characterized by having a surface area of about 50 to 4,000 square meters per gram or a pore volume of about 0.5 to 6 cubic centimeters per gram. The composition may comprise about 5 to 95 wt. % sulfur compound in the carbon-sulfur composite. The carbon powder may comprise carbon having a macromolecular structure ordered in at least two dimensions. The macromolecular structure may be characterized by having two-dimensional carbon sheets which are stacked into carbon layers. The macromolecular structure may be ordered in two dimensions. The macromolecular structure may be ordered in three dimensions. The carbon layers may be associated with a stacking sequence of the two dimensional carbon sheets. The carbon sheets may be associated with basal planes that have slipped out of alignment relative to each other in the macromolecular structure. The carbon layers in the macromolecular structure may have sufficient freedom to randomly translate relative to each other and rotate about a normal of the carbon layers. The carbon powder may be characterized by having a surface area above about 900 square meters per gram carbon powder. The carbon powder may be characterized by having a surface area above about 1,400 square meters per gram carbon powder. The ionomer composition may comprise non-ionomeric polymeric binder. The composition may about 1 to 9 wt. % ionomer composition or about 1 to 6 wt. % ionomer composition. The carbon powder may be characterized by having a surface area of about 900 to 1,900 square meters per gram and a pore volume of about 1.2 to 5 cubic centimeters per gram. The carbon-sulfur composite may be made using a compositing process comprising at least one compositing step. A compositing step in the at least one compositing step may comprise heating the sulfur compound and introducing the heated sulfur compound into the carbon powder to make the carbon-sulfur composite. The compositing process may include heating the sulfur compound to about 160° C. and directly contacting the heated sulfur compound with the carbon powder. The compositing process may include heating the sulfur compound to about 300° C. to form a sulfur vapor and contacting the sulfur vapor with the carbon powder. The hydrocarbon ionomer may comprise at least one ionic group selected from sulfonate, phosphate, phosphonate and carboxylate ionic groups. The hydrocarbon ionomer may be a copolymer comprising about 5 to 25% by weight ionic comonomer. The hydrocarbon ionomer may have a neutralization ratio of greater than about 10%. The hydrocarbon ionomer may be at least partially neutralized with lithium. The hydrocarbon ionomer may be a random copolymer of poly(ethylene-co-(meth)acrylic) acid. The copolymer may be at least partially neutralized and comprises (meth)acrylic acid comonomer that is one of acrylic acid comonomer, methacrylic acid comonomer, or a combination of acrylic acid and methacrylic acid comonomers. The poly(ethylene-co-(meth) acrylic) acid copolymer may incorporate the (meth)acrylic acid comonomer in an incorporation ratio of less than 20% per mole. The hydrocarbon ionomer may be a neutralized polyvinyl sulfonic acid or neutralized sulfonated derivative of a poly(ether ether-ketone). The composition may comprise a plurality of different types of hydrocarbon ionomer.

According to a second principle of the invention, there is a method for making a composition, the method comprising combining ionomer composition and carbon-sulfur composite. The method may comprise combining about 1 to 17.5 wt. % ionomer composition comprising hydrocarbon ionomer. The method may comprise combining about 1 to 99 wt. % carbon-sulfur composite. The carbon-sulfur composite may comprise carbon powder characterized by having a surface area of about 50 to 4,000 square meters per gram or a pore volume of about 0.5 to 6 cubic centimeters per gram. The composition may comprise about 5 to 95 wt. % sulfur compound in the carbon-sulfur composite.

According to a third principle of the invention, there is a layering comprising a plurality of coatings, wherein respective coatings in the plurality of coatings may comprise respective compositions. The respective compositions may be based on at least one composition. The respective compositions may comprise at least one of at least one ionomer composition comprising hydrocarbon ionomer or at least one carbon-sulfur composite or at least one component other than the at least one ionomer composition and the at least one carbon-sulfur composite. The carbon-sulfur composite may comprise at least one carbon powder comprising at least one sulfur compound. The respective compositions may comprise about 1 to 17.5 average wt. % of the at least one ionomer composition. The respective compositions may comprise about 50 to 99 average wt. % of the at least one carbon-sulfur composite. The at least one carbon powder may be characterized by having a surface area of about 50 to 4,000 square meters per gram or a pore volume of about 0.5 to 6 cubic centimeters per gram. The at least one carbon powder may comprise carbon having a macromolecular structure ordered in at least two dimensions. The at least one carbon powder may be characterized by having two-dimensional carbon sheets which are stacked into carbon layers. The at least one carbon-sulfur composite may comprise about 5 to 95 average wt. % of at least one sulfur compound. The respective compositions may comprise at least one of respective ionomer compositions or respective carbon-sulfur composites formed from respective carbon powders loaded with respective sulfur compounds. The respective compositions may be the same or different based on at least one of an amount and a quality of at least one of the respective ionomer compositions, the respective carbon-sulfur composites, the respective carbon powders, the respective sulfur compounds or the at least one component. The plurality of coatings may comprise at least one coating comprising a respective composition comprising about 0 to 100 wt. % ionomer composition, about 0 to 100 wt. % carbon-sulfur composite and about 0 to 100 wt. % conductive carbon black. A sum of the weight percentages of ionomer composition, carbon-sulfur composite and conductive carbon black in the at least one coating may be 100 wt. % or less. The at least one ionomer composition may comprise non-ionomeric polymeric binder. The respective compositions may comprise about 1 to 9 average wt. % of the at least one ionomer composition. The layering may be made using a layering process comprising a plurality of coating steps. A coating step in the plurality may comprise applying a respective composition of the respective compositions combined with a solvent to a surface. The layering process may comprise at least one drying step. A drying step in the at least one drying step may comprise evaporating at least a part of the solvent. The hydrocarbon ionomer may comprise at least one ionic group selected from sulfonate, phosphate, phosphonate and carboxylate ionic groups. The hydrocarbon ionomer may be a copolymer comprising about 5 to 25% by weight ionic comonomer. The hydrocarbon ionomer may have a neutralization ratio of greater than about 10%. The hydrocarbon ionomer may be at least partially neutralized with lithium. The hydrocarbon ionomer may be a random copolymer of poly(ethylene-co-(meth)acrylic) acid. The copolymer may be at least partially neutralized and comprises (meth)acrylic acid comonomer that is one of acrylic acid comonomer, methacrylic acid comonomer, or a combination of acrylic acid and methacrylic acid comonomers. The poly(ethylene-co-(meth)acrylic) acid copolymer may incorporate the (meth)acrylic acid comonomer in an incorporation ratio of less than 20% per mole. The hydrocarbon ionomer may be a neutralized polyvinyl sulfonic acid or neutralized sulfonated derivative of a poly(ether ether-ketone). The composition may comprise a plurality of different types of hydrocarbon ionomer.

According to a fourth principle of the invention, there is a making a layering comprising combining at least one solvent with at least one composition to make at least one mixture for a plurality of coatings. The method may comprise applying the at least one mixture to make the plurality of coatings forming a layering. The respective coatings in the plurality of coatings may comprise respective compositions based on the least one composition. The respective compositions may comprise at least one of at least one ionomer composition comprising hydrocarbon ionomer, at least one carbon-sulfur composite or at least one component other than the at least one ionomer composition and the at least one carbon-sulfur composite. The carbon-sulfur composite may comprise at least one carbon powder comprising at least one sulfur compound. The layering may be made using a layering process comprising a plurality of coating steps. A coating step in the plurality may comprise applying a respective composition of the respective compositions combined with a solvent to a surface. The layering process may comprise at least one drying step. A drying step in the at least one drying step may comprise evaporating at least a part of the solvent of the at least one mixture applied to the surface. The applying may be characterized as being at least one of spray coating, dip coating, spin coating and air brushing. A plurality of the coating steps in the plurality of coating steps may apply respective mixtures of the at least one mixture and the applied respective mixtures may differ from each other based on at least one of an amount and a quality of at least one component in the respective mixtures. The respective compositions may comprise at least one of respective ionomer compositions and respective carbon-sulfur composites formed from respective carbon powders loaded with respective sulfur compounds. The respective compositions may be the same or different based on at least one of an amount and a quality of at least one of the respective ionomer compositions, the respective carbon-sulfur composites, the respective carbon powders, the respective sulfur compounds and the at least one component. The plurality of coatings may comprise at least one coating comprising a respective composition comprising about 0 to 100 wt. % ionomer composition, about 0 to 100 wt. % carbon-sulfur composite or about 0 to 100 wt. % conductive carbon black. A sum of the weight percentages of ionomer composition, carbon-sulfur composite and conductive carbon black in the at least one coating may be 100 wt. % or less. The ionomer composition may comprise non-ionomeric polymeric binder. The composition may about 1 to 9 wt. % ionomer composition, about 1 to 6 wt. % ionomer composition or about 1 to 3 wt. % ionomer composition. The hydrocarbon ionomer may comprise at least one ionic group selected from sulfonate, phosphate, phosphonate and carboxylate ionic groups. The hydrocarbon ionomer may be a copolymer comprising about 5 to 25% by weight ionic comonomer. The hydrocarbon ionomer may have a neutralization ratio of greater than about 10%. The hydrocarbon ionomer may be at least partially neutralized with lithium. The hydrocarbon ionomer may be a random copolymer of poly(ethylene-co-(meth)acrylic) acid. The copolymer may be at least partially neutralized and comprises (meth)acrylic acid comonomer that is one of acrylic acid comonomer, methacrylic acid comonomer, or a combination of acrylic acid and methacrylic acid comonomers. The poly(ethylene-co-(meth)acrylic) acid copolymer may incorporate the (meth)acrylic acid comonomer in an incorporation ratio of less than 20% per mole. The hydrocarbon ionomer may be a neutralized polyvinyl sulfonic acid or neutralized sulfonated derivative of a poly(ether ether-ketone). The composition may comprise a plurality of different types of hydrocarbon ionomer.

According to a fifth principle of the invention, there is an electrode comprising a circuit contact and a composition. The composition may comprise about 1 to 17.5 average wt. % of at least one ionomer composition comprising hydrocarbon ionomer or about 1 to 99 average wt. % of at least one carbon-sulfur composite. The at least one carbon-sulfur composite may comprise at least one carbon powder characterized by having a surface area of about 50 to 4,000 square meters per gram or a pore volume of about 0.5 to 6 cubic centimeters per gram. The at least one carbon-sulfur composite may comprise about 5 to 95 average wt. % of at least one sulfur compound in the at least one carbon-sulfur composite. The at least one carbon powder may comprise carbon having a macromolecular structure ordered in at least two dimensions and characterized by having two-dimensional carbon sheets which are stacked into carbon layers. The macromolecular structure may be ordered in two dimensions. The macromolecular structure may be ordered in three dimensions and the carbon layers may be associated with a stacking sequence of the two dimensional carbon sheets. The carbon sheets may be associated with basal planes that have slipped out of alignment relative to each other in the macromolecular structure. The carbon layers in the macromolecular structure may have sufficient freedom to randomly translate relative to each other and rotate about a normal of the carbon layers. The at least one carbon powder may be characterized by having a surface area above about 900 square meters per gram carbon powder. The at least one carbon powder may be characterized by having a surface area above about 1,400 square meters per gram carbon powder. The at least one ionomer composition may comprise non-ionomeric polymeric binder. The composition may comprise about 1 to 9 average wt. % of the at least one ionomer composition. The composition may comprise about 1 to 6 average wt. % of the at least one ionomer composition. The at least one carbon powder may be characterized by having a surface area of about 900 to 1,900 square meters per gram or a pore volume of about 1.2 to 5 cubic centimeters per gram. The hydrocarbon ionomer may comprise at least one ionic group selected from sulfonate, phosphate, phosphonate and carboxylate ionic groups. The hydrocarbon ionomer may be a copolymer comprising about 5 to 25% by weight ionic comonomer. The hydrocarbon ionomer may have a neutralization ratio of greater than about 10%. The hydrocarbon ionomer may be at least partially neutralized with lithium. The hydrocarbon ionomer may be a random copolymer of poly(ethylene-co-(meth)acrylic) acid. The copolymer may be at least partially neutralized and comprises (meth)acrylic acid comonomer that is one of acrylic acid comonomer, methacrylic acid comonomer, or a combination of acrylic acid and methacrylic acid comonomers. The poly(ethylene-co-(meth)acrylic) acid copolymer may incorporate the (meth)acrylic acid comonomer in an incorporation ratio of less than 20% per mole. The hydrocarbon ionomer may be a neutralized polyvinyl sulfonic acid or neutralized sulfonated derivative of a poly(ether ether-ketone). The composition may comprise a plurality of different types of hydrocarbon ionomer.

According to a sixth principle of the invention, there is an electrode comprising a circuit contact and a layering. The layering may comprise a plurality of coatings, wherein respective coatings in the plurality of coatings comprise respective compositions. The respective compositions may be based on at least one composition. The respective compositions may comprise at least one of at least one ionomer composition comprising hydrocarbon ionomer, at least one carbon-sulfur composite and at least one component other than the at least one ionomer composition and the at least one carbon-sulfur composite. The carbon-sulfur composite may comprise at least one carbon powder comprising at least one sulfur compound. The respective compositions may comprise about 1 to 17.5 average wt. % of the at least one ionomer composition. The respective compositions may comprise about 50 to 99 average wt. % of the at least one carbon-sulfur composite. The at least one carbon powder may be characterized by having a surface area of about 50 to 4,000 square meters per gram or a pore volume of about 0.5 to 6 cubic centimeters per gram. The at least one carbon powder may comprise carbon having a macromolecular structure ordered in at least two dimensions. The at least one carbon powder may be characterized by having two-dimensional carbon sheets which are stacked into carbon layers. The at least one carbon-sulfur composite may comprise about 5 to 95 average wt. % of at least one sulfur compound. The respective compositions may comprise at least one of respective ionomer compositions and respective carbon-sulfur composites formed from respective carbon powders loaded with respective sulfur compounds. The respective compositions may be the same or different based on at least one of an amount and a quality of at least one of the respective ionomer compositions, the respective carbon-sulfur composites, the respective carbon powders, the respective sulfur compounds and the at least one component. The plurality of coatings may comprise at least one coating comprising a respective composition comprising about 0 to 100 wt. % ionomer composition, about 0 to 100 wt. % carbon-sulfur composite and about 0 to 100 wt. % conductive carbon black. A sum of the weight percentages of ionomer composition, carbon-sulfur composite and conductive carbon black in the at least one coating may be 100 wt. % or less. The at least one ionomer composition may comprise non-ionomeric polymeric binder. The respective compositions may comprise about 1 to 9 average wt. % of the at least one ionomer composition. The layering may be made using a layering process comprising a plurality of coating steps. A coating step in the plurality may comprise applying a respective composition of the respective compositions combined with a solvent to a surface. The layering process may comprise at least one drying step. A drying step in the at least one drying step may comprise evaporating at least a part of the solvent. The hydrocarbon ionomer may comprise at least one ionic group selected from sulfonate, phosphate, phosphonate and carboxylate ionic groups. The hydrocarbon ionomer may be a copolymer comprising about 5 to 25% by weight ionic comonomer. The hydrocarbon ionomer may have a neutralization ratio of greater than about 10%. The hydrocarbon ionomer may be at least partially neutralized with lithium. The hydrocarbon ionomer may be a random copolymer of poly(ethylene-co-(meth)acrylic) acid. The copolymer may be at least partially neutralized and comprises (meth)acrylic acid comonomer that is one of acrylic acid comonomer, methacrylic acid comonomer, or a combination of acrylic acid and methacrylic acid comonomers. The poly(ethylene-co-(meth) acrylic) acid copolymer may incorporate the (meth)acrylic acid comonomer in an incorporation ratio of less than 20% per mole. The hydrocarbon ionomer may be a neutralized polyvinyl sulfonic acid or neutralized sulfonated derivative of a poly(ether ether-ketone). The composition may comprise a plurality of different types of hydrocarbon ionomer.

According to a seventh principle of the invention, there is a method for using a cell. The method may comprise converting chemical energy stored in the cell into electrical energy. The method may comprise converting electrical energy into chemical energy stored in the cell. The cell may comprise a negative electrode, a circuit coupling a positive electrode with the negative electrode, an electrolyte medium, and a positive electrode. The positive electrode may comprise (a) a layering comprising a plurality of coatings, wherein respective coatings in the plurality of coatings comprise respective compositions based on at least one composition, wherein the respective compositions may comprise at least one ionomer composition comprising hydrocarbon ionomer, and at least one carbon-sulfur composite, comprising at least one carbon powder, at least one sulfur compound, and at least one component other than the at least one ionomer composition and the at least one carbon-sulfur composite. The positive electrode may comprise (b) a composition comprising about 1 to 17.5 average wt. % of at least one ionomer composition comprising hydrocarbon ionomer, and about 50 to 99 average wt. % of at least one carbon-sulfur composite, the at least one carbon-sulfur composite comprising at least one carbon powder characterized by having a surface area of about 50 to 4,000 square meters per gram and a pore volume of about 0.5 to 6 cubic centimeters per gram, and about 5 to 95 average wt. % of at least one sulfur compound in the at least one carbon-sulfur composite. The carbon powder may comprise carbon having a macromolecular structure ordered in at least two dimensions and characterized by having two-dimensional carbon sheets which are stacked into carbon layers. The cell may be associated with at least one of a portable battery, a power source for an electrified vehicle, a power source for an ignition system of a vehicle and a power source for a mobile device.

The above summary is not intended to describe each embodiment or every implementation of the present invention. Further features, their nature and various advantages will be more apparent from the accompanying drawings and the following detailed description of the examples and embodiments.

BRIEF DESCRIPTION OF THE DRAWINGS

The features and advantages of the present invention become more apparent from the detailed description set forth below when taken in conjunction with the drawings in which like reference numbers indicate identical or functionally similar elements. Additionally, the left-most digit of a reference number identifies the drawing in which the reference number first appears.

In addition, it should be understood that the drawings in the figures, which highlight the aspects, methodology, functionality and advantages of the present invention, are presented for example purposes only. The present invention is sufficiently flexible, such that it may be implemented in ways other than that shown in the accompanying figures.

DETAILED DESCRIPTION

Figure 1:
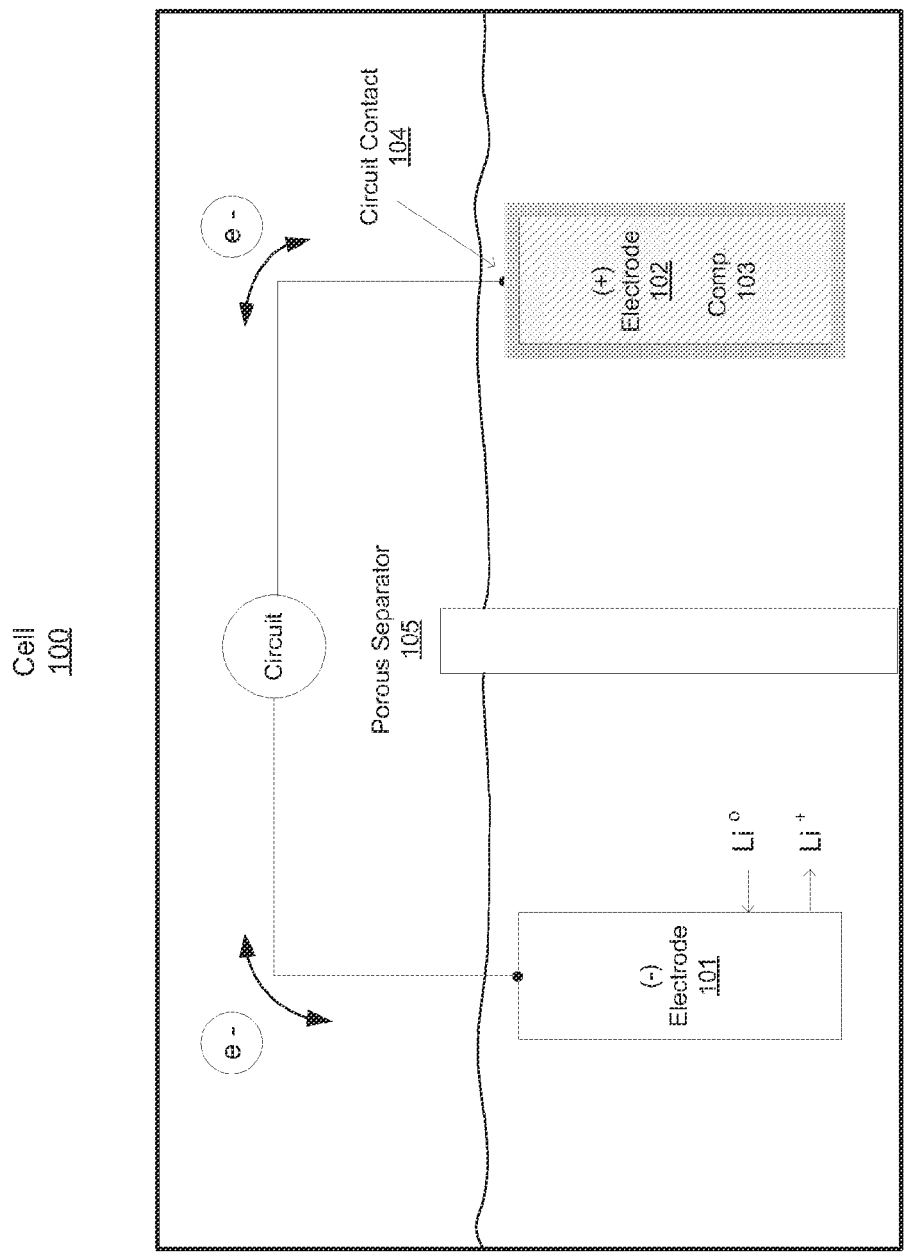
FIG. 1 is a two-dimensional perspective of a Li—S cell incorporating a hydrocarbon ionomer positive electrode, according to an example.

The present invention is useful for certain energy storage applications, and has been found to be particularly advantageous for high maximum discharge capacity batteries which operate with high coulombic efficiency utilizing electrochemical voltaic cells which derive electrical energy from chemical reactions involving sulfur compounds. While the present invention is not necessarily limited to such applications, various aspects of the invention are appreciated through a discussion of various examples using this context.

For simplicity and illustrative purposes, the present invention is described by referring mainly to embodiments, principles and examples thereof. In the following description, numerous specific details are set forth in order to provide a thorough understanding of the examples. It is readily apparent however, that the embodiments may be practiced without limitation to these specific details. In other instances, some embodiments have not been described in detail so as not to unnecessarily obscure the description. Furthermore, different embodiments are described below. The embodiments may be used or performed together in different combinations.

The operation and effects of certain embodiments can be more fully appreciated from a series of examples, as described below. The embodiments on which these examples are based are representative only. The selection of those embodiments to illustrate the principles of the invention does not indicate that materials, components, reactants, conditions, techniques, configurations and designs, etc. which are not described in the examples are not suitable for use, or that subject matter not described in the examples is excluded from the scope of the appended claims and their equivalents. The significance of the examples can be better understood by comparing the results obtained therefrom with potential results which can be obtained from tests or trials that may be or may have been designed to serve as controlled experiments and provide a basis for comparison.

As used herein, the terms "based on", "comprises", "comprising", "includes", "including", "has", "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). Also, use of the "a" or "an" is employed to describe elements and components. This is done merely for convenience and to give a general sense of the description. This description should be read to include one or at least one and the singular also includes the plural unless it is obvious that it is meant otherwise.

The meaning of abbreviations and certain terms used herein is as follows: "Å" means angstrom(s), "g" means gram(s), "mg" means milligram(s), "µg" means microgram(s), "L" means liter(s), "mL" means milliliter(s), "cc" means cubic centimeter(s), "cc/g" means cubic centimeters per gram, "mol" means mole(s), "mmol" means millimole(s), "M" means molar concentration, "wt. %" means percent by weight, "Hz" means hertz, "mS" means millisiemen(s), "mA" mean milliamp(s), "mAh/g" mean milliamp hour(s) per gram, "mAh/g S" mean milliamp hour(s) per gram sulfur based on the weight of sulfur atoms in a sulfur compound, "V" means volt(s), "x C" refers to a constant current that may fully charge/discharge an electrode in 1/x hours, "SOC" means state of charge, "SEI" means solid electrolyte interface formed on the surface of an electrode material, "kPa" means kilopascal(s), "rpm" means revolutions per minute, "psi" means pounds per square inch, "maximum discharge capacity" is the maximum milliamp hour(s) per gram of a positive electrode in a Li—S cell at the beginning of a discharge phase (i.e., maximum charge capacity on discharge), "coulombic efficiency" is the fraction or percentage of the electrical charge stored in a rechargeable battery by charging and is recoverable during discharging and is expressed as 100 times the ratio of the charge capacity on discharge to the charge capacity on charging, "pore volume" (i.e., Vp) is the sum of the volumes of all the pores in one gram of a substance and may be expressed as cc/g, "porosity" (i.e., "void fraction") is either the fraction (0-1) or the percentage (0-100%) expressed by the ratio: (volume of voids in a substance)/(total volume of the substance).

As used herein and unless otherwise stated the term "cathode" is used to identify a positive electrode and "anode" to identify the negative electrode of a battery or cell. The term "battery" is used to denote a collection of one or more cells arranged to provide electrical energy. The cells of a battery can be arranged in various configurations (e.g., series, parallel and combinations thereof).

The term "sulfur compound" as used herein refers to any compound that includes at least one sulfur atom, such as elemental sulfur and other sulfur compounds, such as lithiated sulfur compounds including disulfide compounds and polysulfide compounds. For further details on examples of sulfur compounds particularly suited for lithium batteries, reference is made to "A New Entergy Storage Material: Organosulfur Compounds Based on Multiple Sulfur-Sulfur Bonds", by Naoi et al., J. Electrochem. Soc., Vol. 144, No. 6, pp. L170-L172 (June 1997), which is incorporated herein by reference in its entirety.

As used herein, and unless otherwise stated, the term "turbostratic" is used to identify carbon having a macromolecular structure characterized by having two dimensional carbon sheets which are stacked and the carbon sheets have slipped sideways relative to each other. In turbostratic carbon, the basal planes of the carbon sheets have slipped out of alignment relative to each other. Turbostratic carbon can be compared as a variant of "graphite". Graphite is carbon having a macromolecular structure which is also characterized by two-dimensional carbon sheets which are stacked. However, in graphite the macromolecular structure is stably ordered in three-dimensions and the stacked layers are associated with a stacking sequence. In both graphite and turbostratic carbon, the carbon sheets are stacked into carbon layers. However turbostratic carbon and graphite differ in the degree their respective stacking is ordered. In turbostratic carbon, the carbon layers have sufficient freedom to randomly translate relative to each other and rotate about the normal of the carbon layers. The translation and rotation of the carbon layers in turbostratic carbon changes interlayer spacing between the carbon layers and/or the shape of the carbon layers, at an atomic scale perspective, in the macromolecular structure. By way of contrast, graphite is characterized as a having a stable three dimensional macromolecular structure having a fully ordered parallel stacking sequence with a higher degree of crystallinity. Also, graphitic carbon often has a lower surface area than turbostratic carbon. Turbostratic carbon and graphite are both distinct from "graphene" which is only a single layer of carbon.

As used herein, and unless otherwise stated, the term "graphitic" is used to identify carbon having a macromolecular structure characterized by graphite.

The term "ionomer", as used herein, refers to any polymer including an ionized functional group (e.g., sulfonic acid, phosphonic acid, phosphoric acid or carboxylic acid, such as acrylic or methacrylic acid (i.e., "(meth)acrylic acid") in which the acid group is neutralized with a base including an alkali metal, such as lithium, to form an ionized functionality, such as lithium methacrylate). An ionomer may be made by various methods including polymerizing ionic monomers and by chemically modifying ionogenic polymers. The term "hydrocarbon ionomer", as used herein, refers to any ionomer not including any halogen atoms incorporated by a covalent bond into a site (e.g., the polymer backbone or branching) on the ionomer.

According to the principles of the invention, as demonstrated in the following examples and embodiments, there are hydrocarbon ionomer compositions, layerings and positive electrodes. The hydrocarbon ionomer compositions, layerings and positive electrodes provide Li—S cells with surprisingly high coulombic efficiencies and very high ratios of discharge to charge capacity. While not being bound by any particular theory, it is believed that the hydrocarbon ionomer in the compositions, layerings and positive electrodes suppresses the shuttling of soluble sulfur compounds and their arrival at negative electrodes in the Li—S cells. This reduces capacity fade through sulfur loss in the cells. Furthermore, low sulfur utilization and high discharge capacity degradation are avoided in these cells.

According to various embodiments, different types of hydrocarbon ionomer may be used in forming one or more of the hydrocarbon ionomer compositions, layerings or electrodes, such as an ionomer containing acrylate groups based on ionized acrylic acid, methacrylate groups based on ionized methacrylic acid or a combination of both acrylate and methacrylate (i.e., (meth)acrylate) groups. Examples of hydrocarbon ionomers include SURLYN® and derivatives of SURLYN®, a copolymer of ethylene and (meth)acrylic acid. Depending upon the commercially available grade of SURLYN® that is used, an amount of the ionizable (meth)acrylic acid groups in the SURLYN® can be neutralized to their ionic (meth)acrylate salt. Other examples of hydrocarbon ionomers include sulfonated polyacrylamide and sulfonated polystyrene. Other hydrocarbon ionomers may also be utilized, such as ionomers having ionomer functional groups based on neutralized carboxylic acids, phosphonic acids, phosphoric acids and/or other ionomer functional groups.

Different types of copolymers may be hydrocarbon ionomers, such as copolymers with different non-ionic monomers or multiple types of ionic monomers. Other hydrocarbon ionomers may also be utilized or combined in a hydrocarbon ionomer composition, such as different hydrocarbon ionomers with different chemical structures and/or different polymer substituents which may be the same or different ionomer functional groups. As noted above, hydrocarbon ionomers never contain halogen or halogen-containing substituents, but may include other substituents. In an embodiment, a hydrocarbon ionomer may include alcohol and alkyl substituents. For example, a hydrocarbon ionomer may include unsaturated branches with or without any functional groups or substituents. The substituent sites on a hydrocarbon ionomer may be located anywhere in the polymer, such as along the backbone and along any branching which may be present.

Hydrocarbon ionomer may be combined with other components in making hydrocarbon ionomer compositions, layerings and positive electrodes which can be incorporated into a Li—S cell, according to various embodiments. The hydrocarbon ionomer may be identified or quantified with respect to other components present in different ways. For example, a hydrocarbon ionomer composition may be prepared which is a combination including hydrocarbon ionomer and C—S composite which may be incorporated into a layering structure or a positive electrode, optionally with other components, such as conductive carbon black and polymeric binder which does not contain any ionic functionality, (i.e., non-ionomeric polymeric binder).

Hydrocarbon ionomer may also be present as a function of a structure associated with these embodiments, such as a weight measure of hydrocarbon ionomer per surface area of a layering or a positive electrode. An amount of hydrocarbon ionomer in a layering or positive electrode may be quantified in terms of an amount of hydrocarbon ionomer associated with a volume of material in a coating, or below an area on the surface of a layering or positive electrode. According to an embodiment, a suitable amount of hydrocarbon ionomer in a single coating, a layering or a positive electrode is about 0.0001 to 100 mg/cm$^2$. In other embodiments, a suitable amount of hydrocarbon ionomer is about 0.001 to 75 mg/cm$^2$, about 0.001 to 50 mg/cm$^2$, about 0.001 to 35 mg/cm$^2$, about 0.01 to 20 mg/cm$^2$, about 0.01 to 15 mg/cm$^2$, about 0.1 to 10 mg/cm$^2$ and about 0.3 to 5 mg/cm$^2$.

An amount of hydrocarbon ionomer may be expressed as a weight percentage present in a coating, a layering or a positive electrode. The hydrocarbon ionomer loading may be varied as desired. A positive electrode may be comprised of one layering or a plurality of layerings. According to an embodiment, a suitable amount of hydrocarbon ionomer in a layering or coating is about 0.0001 to 100 wt. %. According to other embodiments, a suitable amount of hydrocarbon ionomer in a layering is about 0.0001 wt. % to about 99 wt. %, 98 wt. %, 95 wt. %, 90 wt. %, 85 wt. %, 80 wt. %, 75 wt. %, 70 wt. %, 65 wt. %, 60 wt. %, 55 wt. %, 50 wt. %, 45 wt. %, 40 wt. %, 35 wt. %, 30 wt. %, 25 wt. %, 20 wt. %, 15 wt. %, 10 wt. %, 5 wt. %, 2 wt. %, 1 wt. %, 0.1 wt. %, 0.01 wt. % and 0.001 wt. %.

According to the principles of the invention, as demonstrated in the following examples and embodiments, there are hydrocarbon ionomer compositions and methods of making a hydrocarbon ionomer composition. There are hydrocarbon ionomer layerings and methods of making a hydrocarbon ionomer layering. And there are hydrocarbon ionomer electrodes and methods of making a hydrocarbon ionomer electrode. According to an example, the composition may include a C—S composite comprising a carbon powder having sulfur compound situated within porous regions of the carbon powder. The C—S composite may be combined with a hydrocarbon ionomer form the composition, according to an embodiment.

The hydrocarbon ionomer composition may be made through various processes which combine components in the composition. According to an embodiment, the components may simply be combined to form a hydrocarbon ionomer composition which may then be incorporated into a hydrocarbon ionomer electrode structure. A positive electrode in a Li—S battery incorporating a hydrocarbon ionomer composition comprising the C—S composite, according to the principles of the invention, demonstrates a high maximum discharge capacity and high sulfur utilization.

In other embodiments, components of the hydrocarbon ionomer composition, comprising the C—S composite, may be combined with a solvent and applied to a surface of a substrate to form a hydrocarbon ionomer layering. The layering may be formed in successive coating steps in a sequential coating process. In an embodiment, the layering may form an electrode incorporating the hydrocarbon ionomer composition in the layering. hydrocarbon ionomer compositions, according to the principles of the invention, may be applied in successive coating steps to form a layering and/or an electrode having the same or varying hydrocarbon ionomer compositions with varying components. The various hydrocarbon ionomer compositions and various separately applied compositions without hydrocarbon ionomer, such as pure carbon black, carbon black and non-ionomeric polymeric binder, pigment, etc. may be applied in separate steps of the successive coating steps. The sequential coating process may also include one or more drying steps to remove solvent from the composition, the layering and/or the electrode. By the successive coating steps, the layering may be built up to a desired thickness and utilized as a hydrocarbon ionomer positive electrode in a Li—S cell of a Li—S battery. The coulombic efficiency associated with a hydrocarbon ionomer positive electrode, incorporating a layering structure, when used in a Li—S cell is surprisingly high and the electrode is without structural difficulties. Without being bound by any particular theory, the high coulombic efficiency observed appears to be a direct consequence of the presence of hydrocarbon ionomer in the positive electrode.

Referring to FIG. 1, depicted is a cell 100, which is a Li—S cell, such as for a Li—S battery. Cell 100 includes a positive electrode 102 incorporating a hydrocarbon ionomer composition 103. The composition 103 is utilized in a hydrocarbon ionomer layering structure which may include a hydrocarbon ionomer coating on the positive electrode 102, according to an example. Cell 100 also includes a lithium containing negative electrode 101 and a porous separator 105. The positive electrode 102 includes a circuit contact 104. The circuit contact 104 provides a conductive conduit for the positive electrode 102 to a circuit coupling negative electrode 101 and positive electrode 102, which are operable in conjunction with each other.

A carbon powder having a high surface area and a high pore volume may be utilized in the making a C—S composite in composition 103. Sulfur compound, such as elemental sulfur, lithium sulfide, and combinations of such, may be introduced to the porous regions within the carbon powder to form a C—S composite having a weight percent sulfur compound. The C—S composite may be with optional components, such as non-ionomeric polymeric binder and carbon black to form the composition 103 incorporated into the positive electrode 102.

The carbon in the carbon powders used for making the C—S composite, according to the principles of the invention, is generally turbostratic carbon or carbon that is turbostratic in nature. Graphitic carbon may also be used, although turbostratic carbon is preferred.

Carbon suitable for use herein in making the C—S composite has a macromolecular structure characterized by having two dimensional carbon sheets which are stacked. According to an embodiment, the carbon sheets have slipped sideways relative to each other. According to another embodiment, the carbon sheets are stacked into carbon layers and the macromolecular structure of the carbon is ordered in at least two dimensions. In another embodiment, the macromolecular structure of the carbon is ordered in three dimensions and a stacking sequence is associated with the stacked carbon layers. In another embodiment, the basal planes of the carbon sheets have slipped out of alignment relative to each other in the macromolecular structure of the carbon. In another embodiment, the carbon layers in the macromolecular structure of the carbon have sufficient freedom to randomly translate relative to each other and rotate about a normal of the carbon layers. In another embodiment, the translation and rotation of the carbon layers may change interlayer spacing between the carbon layers and/or the shape of the carbon layers, at an atomic scale perspective, in the macromolecular structure of the carbon.

Graphitic carbon may also be used in making the C—S composite. In an embodiment, the carbon has a macromolecular structure which is characterized by having two-dimensional carbon sheets which are stacked in a stacking sequence and the macromolecular structure is ordered in three-dimensions. In another embodiment, the macromolecular structure of the carbon is characterized as a having a stable three dimensional structure in a fully ordered parallel stacking sequence. In another embodiment, the carbon has a degree of crystallinity. In yet another embodiment, the carbon layer stacking order is more highly ordered than turbostratic carbon.

A representative carbon powder with turbostratic carbon is KETJENBLACK EC-600JD, distributed by Akzo Nobel having an approximate surface area of 1400 m²/g BET (Product Data Sheet for KETJENBLACK EC-600JD, Akzo Nobel) and an approximate pore volume of 4.07 cc/gram, as determined according to the BJH method, based on a cumulative pore volume for pores ranging from 17-3000 angstroms. In the BJH method, nitrogen adsorption/desorption measurements were performed on ASAP model 2400/2405 porosimeters (Micrometrics, Inc., No. 30093-1877). Samples were degassed at 150° C. overnight prior to data collection. Surface area measurements utilized a five-point adsorption isotherm collected over 0.05 to 0.20 p/p₀ and were analyzed via the BET method, described in Brunauer et al., J. Amer. Chem. Soc., v. 60, no. 309 (1938), and incorporated by reference herein in its entirety. Pore volume distributions utilized a 27 point desorption isotherm and were analyzed via the BJH method, described in Barret et al., J. Amer. Chem. Soc., v. 73, no. 373 (1951), and incorporated by reference herein in its entirety. Additional commercially available carbon powders which may be utilized include KETJENBLACK 300: approximate pore volume 1.08 cc/g (Akzo Nobel) CABOT BLACK PEARLS: approximate pore volume 2.55 cc/g, (Cabot), PRINTEX XE-2B: approximate pore volume 2.08 cc/g (Orion Carbon Blacks, The Cary Company). Other sources of such carbon powders are known to those having ordinary skill in the art.

Other porous carbon materials suitable for use herein may be manufactured or synthesized using known processes, as desired, for their pore volume, surface area and other features. Porous carbon materials suitable for use herein include templated carbons. Templated carbon has a synthesized carbon microstructure which is complementary to an inorganic template used in making the templated carbon. Templated carbon materials are demonstrated in co-assigned and co-pending U.S. Patent Application Ser. No. 61/587,805, filed on Jan. 18, 2012, which is incorporated by reference herein in its entirety.

Carbon powders which are suitable to be utilized herein include those having a surface area of about 100 to 4,000 m²/g carbon powder, about 200 to 3,000 m²/g, about 300 to 2,500 m²/g, about 500 to 2,200 m²/g, about 700 to 2,000 m²/g, about 900 to 1,900 m²/g, about 1,100 to 1,700 m²/g and about 1,300 to 1,500 m²/g carbon powder. Carbon powders which are suitable to be utilized herein include those having a surface area of about 600 m²/g, 800 m²/g, 1,000 m²/g, 1,200 m²/g, 1,400 m²/g, 1,600 m²/g, 1,800 m²/g, 2,000 m²/g, 2,200 m²/g, 2,400 m²/g, 2,600 m²/g, 2,800 m²/g, 3,000 m²/g, 3,200 m²/g, 3,400 m²/g, 3,600 m²/g, 3,800 m²/g, and 4.000 m²/g carbon powder.

Carbon powders which are suitable to be utilized herein also include those having a pore volume ranging from about 0.25 to 10 cc/g carbon powder, from about 0.7 to 7 cc/g, from about 0.8 to 6 cc/g, from about 0.9 to 5.5 cc/g, from about 1 to 5.2 cc/g, from about 1.1 to 5.1 cc/g, from about 1.2 to 5 cc/g, from about 1.4 to 4 cc/g, and from about 2 to 3 cc/g. A particularly useful carbon powder is one having a pore volume that is greater than 1.2 cc per gram and less than 5 cc per gram carbon powder. Carbon powders which are suitable to be utilized herein include those having a pore volume of about 1.4 cc/g, 1.8 cc/g, 2.2 cc/g, 2.4 cc/g, 2.8 cc/g, 3.2 cc/g, 3.6 cc/g, 4.0 cc/g, 4.4 cc/g, 4.8 cc/g, 5.2 cc/g, 5.6 cc/g, 6.0 cc/g, 6.4 cc/g, and 6.8 cc/g carbon powder.

Sulfur compounds which are suitable for use in making the C—S composite in the composition 103 include macromolecular sulfur in its various allotropic forms and combinations thereof, such as "elemental sulfur". Elemental sulfur is a common name for a combination of sulfur allotropes such as puckered $S_8$ rings, and often comprising smaller puckered rings of sulfur. Other sulfur compounds which are suitable are compounds containing sulfur and one or more other elements. A representative sulfur compound is elemental sulfur distributed by Sigma Aldrich as "Sulfur", (Sigma Aldrich, 84683). Other sources of such sulfur compounds are known to those having ordinary skill in the art. In addition, lithiated sulfur compounds such as, for example, $Li_2S$ or $Li_2S_2$ may also be used.

According to the principles of the invention, hydrocarbon ionomer articles, such as a hydrocarbon ionomer composition, layering or positive electrode incorporates at least one type of hydrocarbon ionomer and may incorporate multiple types of hydrocarbon ionomer. In one embodiment, the hydrocarbon ionomer articles comprise a polymeric sulfonate. In another embodiment, the hydrocarbon ionomer articles comprise a polymeric carboxylate. In yet another embodiment the hydrocarbon ionomer articles comprise a polymeric phosphate. In yet another embodiment the hydrocarbon ionomer articles comprise a polymeric phosphonate. In still another embodiment, the hydrocarbon ionomer articles comprise a copolymer including at least two types of ionic functionality. In still yet another embodiment, the hydrocarbon ionomer articles comprise at least two different types of hydrocarbon ionomer with different ionic functionality in the different types of hydrocarbon ionomers.

Hydrocarbon ionomers which are suitable for use herein, include ionomers which include pendant negatively charged functional groups which are neutralized. The negatively charged functional groups, such as an acid (e.g., carboxylic acid, phosphonic acid and sulfonic acid) or an amide (e.g., acrylamide). These negatively charged functional groups are neutralized, fully or partially with a metal ion, preferably with an alkali metal. Lithium is preferred for utilization in a Li—S cell. The hydrocarbon ionomers may contain negatively-charged functional groups, exclusively (i.e., anionomers) or may contain a combination of negatively-charged functional groups with some positively-charged functional groups (i.e., ampholytes).

The hydrocarbon ionomers may include ionic monomer units copolymerized with nonionic (i.e., electrically neutral) monomer units. The hydrocarbon ionomers can be prepared by polymerization of ionic monomers, such as ethylenically unsaturated carboxylic acid comonomers. Other hydrocarbon ionomers which are suitable for making the articles are ionically modified "ionogenic" polymers which made ionomers by chemical modification of negatively charged functional groups on the ionogenic polymer (i.e., chemical modification after polymerization), such as by treatment of a polymer having carboxylic acid functionality which is chemically modified by neutralizing to form ester-containing carboxylate functional groups which are ionized with an alkali metal, thus forming negatively charged ionic functionality. The ionic functional groups may be randomly distributed or regularly located in the hydrocarbon ionomers.

The hydrocarbon ionomers may be polymers including ionic and non-ionic monomeric units in a saturated or unsaturated backbone, optionally including branching, which is carbon based and may include other elements, such as oxygen or silicon. The negatively charged functional groups may be any species capable of forming an ion with an alkali metal. These include, but are not limited to, sulfonic acids, carboxylic acids and phosphonic acids. According to an embodiment, the polymer backbone or branches in the hydrocarbon ionomer may include comonomers such as alkyls. Alkyls which are α-olefins are preferred. Suitable α-olefin comonomers include, but are not limited to, ethylene, propylene, 1-butene, 1-pentene, 1-hexene, 1-heptene, 3 methyl-1-butene, 4-methyl-1-pentene, styrene and the like and mixtures of two or more of these α-olefins.

According to an embodiment, the hydrocarbon ionomers are ionogenic acid copolymers which are neutralized with a base so that the acid groups in the precursor acid copolymer form ester salts, such as carboxylate or sulfonate groups. The precursor acid copolymer groups may be fully neutralized or partially neutralized to a "neutralization ratio" based on the amount neutralized of all the negatively charged functional groups that may be neutralized in the ionomer. According to an embodiment, the neutralization ratio is 0% to about 1%. In other embodiments, the neutralization ratio is about 5%, about 10%, about 20%, about 30%, about 40%, about 50%, about 60%, about 70%, about 80%, about 90%, about 95%, or about 100%. According to an embodiment, the neutralization ratio is about 0% to 90%. In other embodiments, the neutralization ratio is about 20% to 80%, about 30% to 70%, about 40% to 60% or about 50%.

The neutralization ratio may be selected for different properties, such as to promote conductivity in the ionomer, to promote the dispersability of the hydrocarbon ionomer in a particular solvent or to promote miscibility with another polymer in a blend. Methods of changing the neutralization ratio include increasing the neutralization, such as by introducing basic ion sources to promote a greater degree of ionization among the monomer units. Methods of changing the neutralization ratio also include those for decreasing neutralization, such as by introducing a highly neutralized ionomer to strong acids so as to convert some or all of an ionic functionality (e.g., (meth)acrylate) to an acid (e.g., (meth)acrylic acid).

Although any stable cation is believed to be suitable as a counter-ion to the negatively charged functional groups in a hydrocarbon ionomer, monovalent cations, such as cations of alkali metals, are preferred. Still more preferably, the base is a lithium ion-containing base, to provide a lithiated hydrocarbon ionomer wherein part or all of the precursor groups are replaced by lithium salts. To obtain the hydrocarbon ionomers, the precursor polymers may be neutralized by any conventional procedure with an ion source. Typical ion sources include sodium hydroxide, sodium carbonate, zinc oxide, zinc acetate, magnesium hydroxide, and lithium hydroxide. Other ion sources are well known and a lithium ion source is preferred.

According to an embodiment, a suitable hydrocarbon ionomer includes ethylene-(meth)acrylic acid copolymer having about 5 to 25 wt. % (meth)acrylic acid monomer units based on the weight of the ethylene-(meth)acrylic acid copolymer; and more particularly, the ethylene-(meth)acrylic acid copolymer has a neutralization ratio of 0.40 to about 0.70. Hydrocarbon ionomers suitable for use herein are available from various commercial sources or they can be prepared by synthesis.

SURLYN® is an example of a carboxylate hydrocarbon ionomer which is a random copolymer—poly(ethylene-co-(meth)acrylic acid). E.I. du Pont de Nemours and Co., Wilmington, Del., provides the SURLYN® resin brand, a copolymer of ethylene and (meth)acrylic acid. It is produced through the copolymerization of ethylene and (meth)acrylic acid via a high pressure free radical reaction, similar to that for the production of low density polyethylene and has an incorporation ratio of (meth)acrylic comonomer that is relatively low and is typically less than 20% per mole and often less than 15% per mole of the copolymer. Variants of the SURLYN® resin brand are disclosed in U.S. Pat. No. 6,518,365 which is incorporated by reference herein in its entirety. According to an embodiment, particularly useful hydrocarbon ionomers include SURLYN® and variants of SURLYN® which are derivatives of commercially available forms of SURLYN®. One SURLYN® variant may be made by treating SURLYN® with a strong acid to reduce the overall neutralization ratio to promote its dispersability in aqueous solution. According to another variant, SURLYN® is ion-exchanged to increase the lithium ion content.

The hydrocarbon ionomer may be neutralized. Neutralization of the hydrocarbon ionomer may be with a neutralization agent that may be represented by the formulas MA where M is a metal ion and A is the co-agent moiety such as an acid or base. Metal ions suitable as the metal ion include monovalent, divalent, trivalent and tetravalent metals. Metal ions suitable for use herein include, but are not limited to, ions of Groups IA, IB, IIA, IIB, IIIA, IVA, IVB, VB, VIIB, VIIB and VIII metals of the Periodic Table. Examples of such metals include $Na^+$, $Li^+$, $K^+$ and $Sn^{4+}$. $Li^+$ is preferred for uses of the hydrocarbon ionomer in a Li—S cell.

Neutralization agents suitable for use herein include any metal moiety which would be sufficiently basic to form a salt with a low molecular weight organic acid, such as benzoic acid or p-toluene sulfonic acid. One suitable neutralization agent is lithium hydroxide distributed by Sigma Aldrich (Sigma Aldrich, 545856). Other neutralization agents and neutralization processes to form hydrocarbon ionomers are described in U.S. Pat. No. 5,003,012 which is incorporated by reference herein in its entirety.

Other hydrocarbon ionomers which are suitable include block copolymers such as those derived from the sulphonation of polystyrene-b-polybutadiene-b-polystyrene. Sulfonated polysulphones and sulfonated polyether ether ketones are also suitable. Phosphonate hydrocarbon ionomers may also be used, as well as copolymers with more than one ionic functionality. For example, direct co-polymerization of dibutyl vinylphosphonate with acrylic acid yields a mixed carboxylate-phosphonate ionomer. Copolymers derived from vinyl phosphonates with styrene, methyl methacrylate, and acrylamide may also be used. Phosphorus containing polymers can also be made after polymerization by phosphonylation reactions, typically with POCl3. For example, phosphonylation of polyethylene can produce a polyethylene-phosphonic acid copolymer.

Hydrocarbon ionomers which are suitable for use include carboxylate, sulfonate and phosphonate hydrocarbon ionomers. Others are also suitable, such as styrene alkoxide hydrocarbon ionomers such as those derived from polystyrene-co-4-methoxy styrene. A hydrocarbon ionomer may have a polyvinyl or a polydiene backbone. Different hydrocarbon ionomers may differ in properties, partly due to differences in the strength of the ionic interactions and structure. Carboxylate hydrocarbon ionomers, sulfonate hydrocarbon ionomers, and their mixtures are preferred. Also hydrocarbon ionomers in which the negatively charged ionic functional groups are neutralized with a lithium ion source to form a salt with lithium are preferred.

The positive electrode 102 in cell 100 is made by incorporating composition 103 comprising hydrocarbon ionomer and C—S composite made from sulfur compound and carbon powder, as described above. The composition 103 may also include non-ionomeric polymeric binder and carbon black.

Non-ionomeric polymeric binder which may be utilized for making the composition 103 includes polymers exhibiting chemical resistance, heat resistance as well as binding properties, such as polymers based on alkylenes, oxides and/or fluoropolymers. Examples of these polymers include polyethylene oxide (PEO), polyisobutylene (PIB), and polyvinylidene fluoride (PVDF). A representative polymeric binder is polyethylene oxide (PEO) with an average $M_w$ of 600,000 distributed by Sigma Aldrich as "Poly(ethylene oxide)" (Sigma Aldrich, Product No. 182028). Another representative polymeric binder is polyisobutylene (PIB) with an average $M_w$ of 4,200,000 distributed by Sigma Aldrich as "Poly (isobutylene)", (Sigma Aldrich, 181498). Polymeric binders which are suitable for use herein are also described in U.S. Published Patent Application No. US2010/0068622, which is incorporated by reference herein in its entirety. Other sources of polymeric binders are known to those having ordinary skill in the art.

Carbon blacks which are suitable for making the composition 103 include carbon substances exhibiting electrical conductivity and generally having a lower surface area and lower pore volume relative to the carbon powder described above. Carbon blacks typically are colloidal particles of elemental carbon produced through incomplete combustion or thermal decomposition of gaseous or liquid hydrocarbons under controlled conditions. Other conductive carbons which are also suitable are based on graphite. Suitable carbon blacks include acetylene carbon blacks which are preferred. A representative carbon black is SUPER C65 distributed by Timcal Ltd. and having BET nitrogen surface area of 62 $m^2$/g carbon black measured by ASTM D3037-89. Other commercial sources of carbon black, and methods of manufacturing or synthesizing them, are known to those having ordinary skill in the art.

Carbon blacks which are suitable for use herein include those having a surface area ranging from about 10 to 250 square meters per gram carbon black, about 30 to 200 square meters per gram, about 40 to 150 square meters per gram, about 50 to 100 square meters per gram and about 60 to 80 square meters per gram carbon black.

The C—S composite includes a porous carbon material, such as carbon powder, containing the sulfur compound situated in the carbon microstructure of the porous carbon material. The amount of sulfur compound which may be contained in the C—S composite (i.e., the sulfur loading in terms of the weight percentage of sulfur compound, based on the total weight of the C—S composite), is dependent to an extent on the pore volume of the carbon powder. Accordingly, as the pore volume of the carbon powder increases, higher sulfur loading with more sulfur compound is possible. Thus, a sulfur compound loading of, for example, about 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 85 wt. %, 90 wt. % or 95 wt. % may be used. Ranges among these amounts define embodiments which may be used.

The composition 103 may include various weight percentages of C—S composite. In an embodiment, this weight percentage ranges from about wt. 1% to about 99 wt. % of composition 103. The composition 103 may optionally include non-ionomeric polymeric binder, hydrocarbon ionomer, and carbon black in addition to the C—S composite. Exclusive of the amount of hydrocarbon ionomer present, C—S composite is generally present in the composition 103 in an amount which is greater than 50 wt. % of the remainder (i.e., excluding hydrocarbon ionomer) of the composition 103. Higher loading with more C—S composite is possible. Thus, exclusive of the amount of hydrocarbon ionomer present, a C—S composite loading of, for example, about 55 wt. %, 60 wt. %, 65 wt. %, 70 wt. %, 75 wt. %, 80 wt. %, 85 wt. %, 90 wt. %, 95 wt. %, 98 wt. %, or 99 wt. % may be used. According to an embodiment, exclusive of the amount of hydrocarbon ionomer present, about 50 to 99 wt. % C—S composite may be used. In another embodiment, exclusive of the amount of hydrocarbon ionomer present, about 70 to 95 wt. % C—S composite may be used. Ranges among these amounts define embodiments which may be used.

Exclusive of the amount of hydrocarbon ionomer present, polymeric binder (i.e., non-ionomer polymeric binder) may be present in the composition 103 in an amount which is greater than 1 wt. %. Higher loading with more polymeric binder is possible. Thus, a polymeric binder loading of, for example, about 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. % or 17.5 wt. % may be used exclusive of the amount of hydrocarbon ionomer present. According to an embodiment, about 1 to 17.5 wt. % polymeric binder may be used exclusive of the amount of hydrocarbon ionomer present. In another embodiment, about 1 to 12 wt. % polymeric binder may be used exclusive of the amount of hydrocarbon ionomer present. In another embodiment, about 1 to 9 wt. % polymeric binder may be used exclusive of the amount of hydrocarbon ionomer present. Ranges among these amounts define embodiments which may be used.

According to an embodiment, the carbon black may optionally be present in the composition 103 in an amount which is greater than 0.01 wt. %. Higher loading with more carbon black is possible. Thus, a carbon black loading, exclusive of the amount of hydrocarbon ionomer present, of about 0.1 wt. %, about 1 wt. %, about 2 wt. %, 3 wt. %, 4 wt. %, 5 wt. %, 6 wt. %, 8 wt. %, 10 wt. %, 12 wt. %, 14 wt. %, 15 wt. %, or 20 wt. % may be used. According to an embodiment, about 0.01 to 15 wt. % carbon black may be used, exclusive of the amount of hydrocarbon ionomer present. In another embodiment, about 5 to 10 wt. % carbon black may be used, exclusive of the amount of hydrocarbon ionomer present. Ranges among these amounts define embodiments which may be used.

The C—S composite may made by various methods, including simply mixing, such as by dry grinding, the carbon powder with the sulfur compound. C—S composite may also be made by introducing the sulfur compound into the microstructure of the carbon powder utilizing such vehicles as heat, pressure, liquid (e.g., a dissolution of sulfur compound in carbon disulfide and impregnation by contacting the solution with the carbon powder), etc.

Useful methods for introducing sulfur compound into the carbon powder include melt imbibement and vapor imbibement. These are compositing processes for introducing the sulfur compound into the microstructure of the carbon powder utilizing such vehicles as heat, pressure, liquid, etc.

In melt imbibement, a sulfur compound, such as elemental sulfur can be heated above its melting point (about 113° C.) while in contact with the carbon powder to impregnate it. The impregnation may be accomplished through a direct process, such as a melt imbibement of elemental sulfur, at a raised temperature, by contacting the sulfur compound and carbon at a temperature above 100° C., such as 160° C. A useful temperature range is 120° C. to 170° C.

Another imbibement process which may be used for making the C—S composite is vapor imbibement which involves the deposition of sulfur vapor. The sulfur compound may be raised to a temperature above 200° C., such as 300° C. At this temperature, the sulfur compound is vaporized and placed in proximity to, but not necessarily in direct contact with, the carbon powder.

These processes may be combined. For example, melt imbibement process can be followed by a higher temperature process. Alternatively, the sulfur compound can be dissolved in carbon disulfide to form a solution and the C—S composite can be formed by contacting this solution with the carbon powder. The C—S composite is prepared by dissolving sulfur compound in non-polar solvent such as toluene or carbon disulfide and contacted with the carbon powder. The solution or dispersion can be contacted, optionally, at incipient wetness to promote an even deposition of the sulfide compound into the pores of the carbon powder. Incipient wetness is a process in which the total liquid volume exposed to the carbon powder does not exceed the volume of the pores of that porous carbon material. The contacting process can involve sequential contacting and drying steps to increase the weight % loading of the sulfur compound.

Sulfur compound may also be introduced to the carbon powder by other methods. For example, sodium sulfide ($Na_2S$) can be dissolved in an aqueous solution to form sodium polysulfide. The sodium polysulfide can be acidified to precipitate the sulfur compound in the carbon powder. In this process, the C—S composite may require thorough washing to remove salt byproducts.

Suitable introducing methods include melt imbibement and vapor imbibement. One method of melt imbibement includes heating elemental sulfur ($Li_2S$ will not melt under these conditions) and carbon powder at about 120° C. to about 170° C. in an inert gas, such as nitrogen. A vapor imbibement method may also be utilized. In the vapor imbibement method, sulfur vapor may be generated by heating a sulfur compound, such as elemental sulfur, to between the temperatures of about 120° C. and 400° C. for a period of time, such as about 6 to 72 hours in the presence of the carbon powder. Other examples of melt imbibement and vapor imbibement are shown in co-assigned and co-pending U.S. Patent Application Ser. No. 61/587,805, filed on Jan. 18, 2012, which is incorporated by reference above.

According to an embodiment, a positive electrode 102 may be formed directly applying a composition 103 in which a C—S composite formed by a compositing process is combined with a hydrocarbon ionomer, and optionally a carbon black and non-ionomeric hydrocarbon ionomer, wherein the applied composition 103 is made by conventional mixing or grinding processes. A solvent, preferably an organic solvent, such as toluene, alcohol, or n-methylpyrrolidone (NMP) may optionally be utilized depending on the polymeric binder system. The solvent should preferably not react with the binder so as to break the polymeric binder down, or significantly alter it. Conventional mixing and grinding processes are known to those having ordinary skill in the art. The ground or mixed components may form a composition 103, according to an embodiment, which may be formed into a positive electrode 102, according to an embodiment.

According to another embodiment, a layering or an electrode incorporating composition 103 may be derived through a layering process to form the layering or the electrode. The layering process may utilize, for example, a carbon powder having a pore volume greater than 1.2 cc/g in a C—S composite. The layering or the electrode may be formed through the application of one or several individual layers on a surface of a detachable substrate.

The individual layers in a spray coated layering/electrode may have the same or different proportions of different components. For example, different sets of materials with different components and different proportions of components may be prepared and applied in combination to form a layering/electrode. One or more components may be completely absent from any one material applied this way. The different materials may be applied using different coating apparatuses and different application techniques. In addition, each individual coating in a layering may include a composition which is different from the compositions in the other coatings of the layering with respect to one or more components, measures of a component, etc. For example, a first coating may include C—S composite and no hydrocarbon ionomer while a second coating may only include hydrocarbon ionomer and no C—S composite. In another example, the respective compositions for the respective coatings in a layering are all different. In yet another example, one composition is used for half the coatings in a layering and a variety of compositions are used in the other coatings. In another example, every coating in a layer may include a different composition, etc.

For example, two materials may be prepared with different types hydrocarbon ionomer and/or different amounts of hydrocarbon ionomer. In another example, two materials may be prepared with different types of C—S composites and/or different amounts of C—S composites. In this example, the respective C—S composites in the two materials may have carbon powders with differing physical properties, sulfur compound loadings, etc. This may be applied in alternate passes of a spray coating to for a layering electrode with an averaging of the two materials throughout or with localized concentrations of one and/or another material. The components in different sets of materials may vary according to multiple parameters, such as respective hydrocarbon ionomers and their weight percentages, respective C—S composites and their weight percentages, respective carbon powders and their weight percentages and sulfur compound species and their weight percentages in the respective C—S composites of the different materials.

The different materials may be applied separately or in alternating sequences. In addition, they may include optional components in different amounts such as conductive carbon black, or an inert substance such as a pigment. It is possible to vary any ingredient, such as an optional low surface conductive carbon in each of the layers. For example, a variation can be an absence of all conductive carbon, such as, for example, in the layer closest to the current collector, and the weight percentage can increase as the layering or electrode is built up moving away from the current collector. So, each layer can have a different composition, such as by varying C—S composite types or combinations of C—S composite types, hydrocarbon ionomer types or combinations of hydrocarbon ionomers, conductive carbon types or combinations of conductive carbon types. The number of possibilities is without any substantial limit.

Also, a porogen (i.e., a void or pore generator) may be included within the layers themselves in the positive electrode. A porogen is any additive which can be removed by a chemical or thermal process to leave behind a void, changing the pore structure of the layering or electrode. This level of porosity control may be utilized in terms of managing mass transfer in a laying or electrode layer. For example, a porogen may be a carbonate, such as calcium carbonate powder, which is added to an ink slurry applied in a layer and then coated in combination with other components in the ink slurry, such as C—S composite, hydrocarbon ionomer and an optional conductive carbon, onto an aluminum foil current collector to form a layering or electrode. A porogen may also be added in intervening layers and between layers containing the C—S composite. It may be desirable to add the porogen in higher concentrations closer to the current collector to create a gradient in the direction of the thickness of the layering or electrode. Once the porogen is in place in the formed layering or electrode, it may then be removed from by washing with dilute acid to leave a void or pore. The type of porogen and the amount can be varied in each layer to control the porosity of the layering or electrode.

An individual layer may cover part or all of an area on the surface. In an example, the coating may be applied in a Raster scan order over part or all of an area and involve multiple passes of spray coating over the area to form one or more coatings. Spray coating to build-up a layering or electrode may include a few or hundreds of passes from a spray coating device. A single pass may be very small or very large, and involve small or large amounts of mixture comprising varying amounts of composition and solvent which is laid down by spraying particles of the mixture. The particle size of the particles in spray may vary and is generally on the order of 0.1 to 0.5 microns to as much as 1 micron. A single pass may deliver a small amount of material to the surface as a coating. For instance, if the final electrode contains 2.5 mg/cm$^2$ of applied material after drying, each single pass may only deliver as little as 6 micrograms/cm$^2$ of material after drying. The coatings may be provided cumulatively in greater or lesser amounts of applied material in the passes of the spray coating device, as desired. Generally, coatings applied with greater amounts of material applied may be utilized. It may be preferable in these circumstances to utilize some combination of time, heating or drying, subsequent to each pass or after some number of passes, in forming the layering.

The composition 103 may be applied in a coating to form a layering. For example, the ratio of hydrocarbon ionomer to C—S composite in terms of the weight percentage of composition 103 may vary in different coatings of a layering. Furthermore, other variants, such as the sulfur compound weight percentage in the C—S composite, may also vary in different coatings. The C—S composite or hydrocarbon ionomer weight percentages in the composition 103 may also vary. The composition weight percentages of the C—S composite and hydrocarbon ionomer may vary together with or separately from the weight percentage of the sulfur compound in the C—S composite in different coatings of a layering, etc. The type of porous carbon used in the C—S composite may vary from layer to layer. Each layer may contain one or more C—S composites, but can contain other C—S composites formed from different porous carbon powders and having different sulfur compound weight percentages in the C—S composites. The number of coatings in a layering or electrode is not limited, and is ordinarily greater than 30, but may be a single coating, or may number into the hundreds, the thousands, the millions and higher.

According to an example, coatings to form a layering may include the composition 103, comprising a C—S composite, and a hydrocarbon ionomer. These components may be combined with a solvent, such as ethanol, toluene, or ethanol optionally combined with water and carbon black. The combination with a solvent provides a slurry or ink which may be applied in one or more low weight coatings to form a layering on a detachable or adhered substrate. The use of the layering process, optionally combined with the use of a high pore volume carbon powder made via a compositing process, provides a very stable and conductive host for electroactive sulfur compound in a positive electrode.

Li—S cells with electrodes made using a layering process to form a layering in a positive electrode, when lithium metal is used in a coupled negative electrode; are operable with very high discharge capacity retention. In some cases greater than 95% retention of discharge capacity is achieved after 80 discharge cycles at C/5 rates (335 mAh/g S). According to other examples, the successive coatings may also be used to create alternative electrode architectures such as low coating weight layering(s) forming various components, alternating layering, or patterns on an electrode surface.

According to an example, by applying several hundred coatings, such as 300-400 coatings, to build an electrode that is about 1 mil in thickness, an improved electrode is fabricated which does not show significant cracking or delaminating from a substrate to which the coatings are applied to form the layering. In another example, after a number of coatings, such as every fourth coating, the layering may be briefly dried at an elevated temperature, such as 70° C. or higher, to effect a controlled removal of the solvent. By this controlled removal of the solvent, macroscopic shrinkage of the layering may also be controlled and electrode cracking and/or delaminating may be avoided.

According to an example, a layering or electrode may not be a continuous coating. According to another example, several hundred coatings may be employed to achieve a desired thickness. According to other examples, a drying step may be performed after every coating, or at every 20 coating, 10 coatings, etc. The dispersion or slurry for the coating can be preheated to facilitate drying. Any combination of drying steps, coating steps or sequences of such may be used to build up the layering or electrode. In another example, continuous heating of the coatings may be utilized to facilitate evaporation of solvent from the coatings in a layering. A mixture comprising the composition 103 and a solvent may be heated to facilitate evaporation of the solvent during the coating process. According to other examples, the layering process to form the layering in an electrode may utilize any coating process which involves multiple coating depositions, such as spray coating, dip coating, spin coating and air brushing.

Referring again to FIG. 1, depicted is the positive electrode 102, that may be formed incorporating a composition 103 as described above. The formed positive electrode 102 may be utilized in the cell 100 in conjunction with a negative electrode, such as the lithium-containing negative electrode 101 described above. According to different embodiments, the negative electrode 101 may contain lithium metal or a lithium alloy. In another embodiment, the negative electrode 101 may contain graphite or some other non-lithium material. According to this embodiment, the positive electrode 102 is formed to include some form of lithium, such as lithium sulfide (Li$_2$S), and according to this embodiment, the C—S composite may be lithiated utilizing lithium sulfide which is incorporated into the powdered carbon to form the C—S composite, instead of elemental sulfur.

A porous separator, such as porous separator 105, may be constructed from various materials. As an example, a mat or other porous article made from fibers, such as polyimide fibers, may be used as the porous separator 105. In another example, using porous laminates made from polymers such as polyvinylidene fluoride (PVDF), polyvinylidene fluoride co-hexafluoropropylene (PVDF-HFP), polyethylene (PE), polypropylene (PP), polyimide, polymer blends.

Positive electrode 102, negative electrode 101 and porous separator 105 are in contact with a lithium-containing electrolyte medium in the cell 100, such as a cell solution with solvent and electrolyte. In this embodiment, the lithium-containing electrolyte medium is a liquid. In another embodiment, the lithium-containing electrolyte medium is a solid. In yet another embodiment, the lithium-containing electrolyte medium is a gel.

Figure 2:
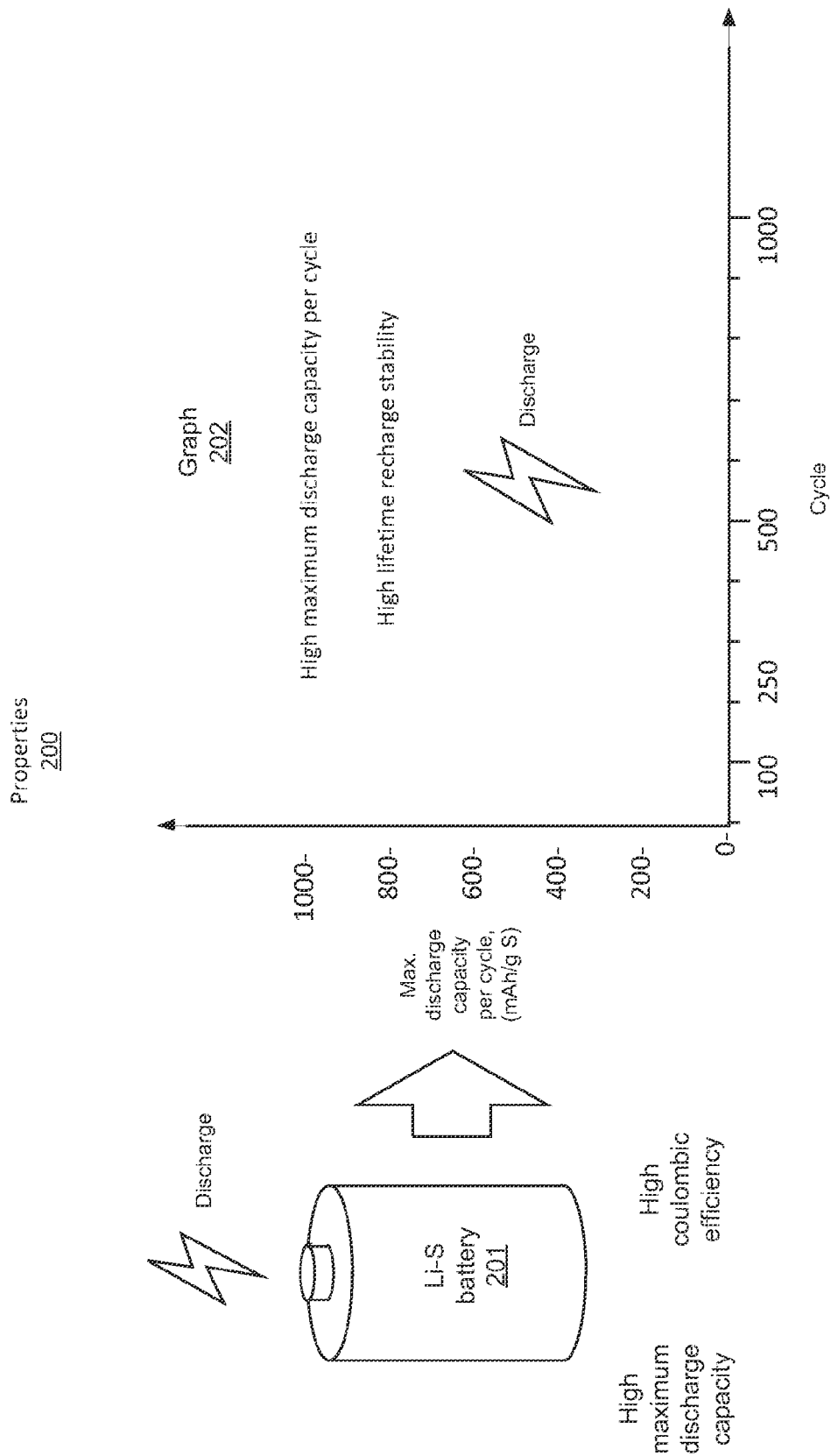
FIG. 2 is a context diagram illustrating properties of a Li—S battery including a Li—S cell incorporating a hydrocarbon ionomer positive electrode, according to an example.

Referring to FIG. 2, depicted is a context diagram illustrating properties 200 of a Li—S battery 201 comprising a Li—S cell, such as cell 100, having a positive electrode comprising composition 103 comprising hydrocarbon ionomer and C—S composite in a layering structure, such as positive electrode 102. The context diagram of FIG. 2 demonstrates the properties 200 of the Li—S battery 201, having a high coulombic efficiency and high maximum discharge capacity. The high coulombic efficiency appears to be directly attributable to the presence of the hydrocarbon ionomer in composition 103. FIG. 2 also depicts a graph 202 demonstrating maximum discharge capacity per cycle with respect to a number of charge-discharge cycles of the Li—S battery 201. The Li—S battery 201 also exhibits high lifetime recharge stability and a high maximum discharge capacity per charge-discharge cycle. All these properties 200 of the Li—S battery 201 are demonstrated in greater detail below through the specific examples.

Figure 3:
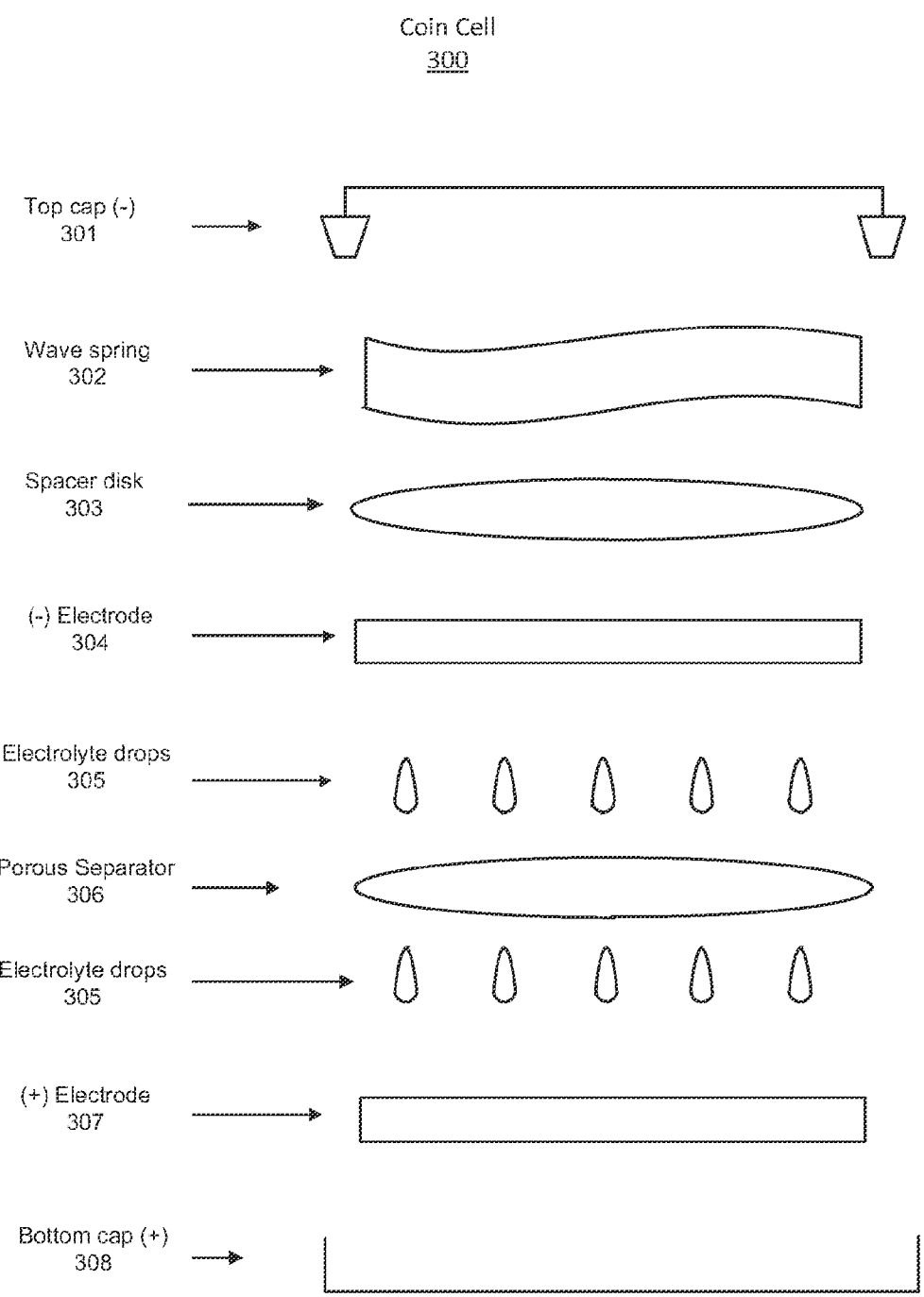
FIG. 3 is a two-dimensional perspective of a Li—S coin cell incorporating a hydrocarbon ionomer positive electrode, according to different examples.

Referring to FIG. 3, depicted is a coin cell 300 which is operable as an electrochemical measuring device for testing various layering structures and variants of composition 103 comprising hydrocarbon ionomer and C—S composite. The function and structure of the coin cell 300 are analogous to those of the cell 100 depicted in FIG. 1. The coin cell 300, like the cell 100, utilizes a lithium-containing electrolyte medium. The lithium-containing electrolyte medium is in contact with the negative electrode and the positive electrode and may be a liquid containing solvent and lithium ion electrolyte.

The lithium ion electrolyte may be non-carbon-containing. For example, the lithium ion electrolyte may be a lithium salt of such counter ions as hexachlorophosphate ($PF_6^-$), perchlorate, chlorate, chlorite, perbromate, bromate, bromite, periodiate, iodate, aluminum fluorides (e.g., $AlF_4^-$), aluminum chlorides (e.g. $Al_2Cl_7^-$, and $AlCl_4^-$), aluminum bromides (e.g., $AlBr_4^-$), nitrate, nitrite, sulfate, sulfites, permanganate, ruthenate, perruthenate and the polyoxometallates.

In another embodiment, the lithium ion electrolyte may be carbon containing. For example, the lithium ion salt may contain organic counter ions such as carbonate, the carboxylates (e.g., formate, acetate, propionate, butyrate, valerate, lactacte, pyruvate, oxalate, malonate, glutarate, adipate, deconoate and the like), the sulfonates (e.g., $CH_3SO_3^-$, $CH_3CH_2SO_3^-$, $CH_3(CH_2)_2SO_3^-$, benzene sulfonate, toluenesulfonate, dodecylbenzene sulfonate and the like. The organic counter ion may include fluorine atoms. For example, the lithium ion electrolyte may be a lithium ion salt of such counter anions as the fluorosulfonates (e.g., $CF_3SO_3^-$, $CF_3CF_2SO_3—$, $CF_3(CF_2)_2SO_3^-$, $CHF_2CF_2SO_3^-$ and the like), the fluoroalkoxides (e.g., $CF_3O—$, $CF_3CH_2O^-$, $CF_3CF_2O^-$ and pentafluorophenolate), the fluoro carboxylates (e.g., trifluoroacetate and pentafluoropropionate) and fluorosulfonimides (e.g., $(CF_3SO_2)_2N^-$). Other electrolytes which are suitable for use herein are disclosed in U.S. Published Patent Applications 2010/0035162 and 2011/00052998 both of which are incorporated herein by reference in their entireties.

The electrolyte medium may exclude a protic solvent, since protic liquids are generally reactive with the lithium anode. Solvents are preferable which may dissolve the electrolyte salt. For instance, the solvent may include an organic solvent such as polycarbonate, an ether or mixtures thereof. In other embodiments, the electrolyte medium may include a non-polar liquid. Some examples of non-polar liquids include the liquid hydrocarbons, such as pentane, hexane and the like.

Electrolyte preparations suitable for use in the cell solution may include one or more electrolyte salts in a nonaqueous electrolyte composition. Suitable electrolyte salts include without limitation: lithium hexafluorophosphate, Li $PF_3$ $(CF_2CF_3)_3$, lithium bis(trifluoromethanesulfonyl)imide, lithium bis(perfluoroethanesulfonyl)imide, lithium (fluorosulfonyl) (nonafluoro-butanesulfonyl)imide, lithium bis (fluorosulfonyl)imide, lithium tetrafluoroborate, lithium perchlorate, lithium hexafluoroarsenate, lithium trifluoromethanesulfonate, lithium tris(trifluoromethanesulfonyl)methide, lithium bis(oxalato)borate, lithium difluoro(oxalato)borate, $Li_2B_{12}F_{12-x}H_x$ where x is equal to 0 to 8, and mixtures of lithium fluoride and anion receptors such as $B(OC_6F_5)_3$. Mixtures of two or more of these or comparable electrolyte salts can also be used. In one embodiment, the electrolyte salt is lithium bis(trifluoromethanesulfonyl) imide). The electrolyte salt may be present in the nonaqueous electrolyte composition in an amount of about 0.2 to about 2.0 M, more particularly about 0.3 to about 1.5 M, and more particularly about 0.5 to about 1.2 M.

EXAMPLES

The following examples demonstrate sample compositions, including hydrocarbon ionomer, as composition 103, incorporated into positive electrode 307 of coin cell 300. Samples for comparative examples A and B demonstrate compositions without hydrocarbon ionomer. Reference is made to the specific examples below.

Example 1

Example 1 describes the preparation and electrochemical evaluation of a layering/electrode including a hydrocarbon ionomer which is a lithium-exchanged derivative of SUR-LYN®, a copolymer of ethylene and methacrylate. The final layering/electrode is prepared from a spray coated base layering/electrode incorporating a base composition. The base composition includes KETJENBLACK 600 (high surface area, high pore volume carbon) C—S composite, polyethylene oxide (PEO) binder and low surface area conductive carbon black. The base layering/electrode is sprayed with a hydrocarbon ionomer solution of lithium exchanged SUR-LYN® to form the final layering/electrode. In the final layering/electrode, the hydrocarbon ionomer is predominantly located at the outer surface away from the supporting substrate.

Preparation of C—S Composite:

Approximately 1.0 g of carbon powder (KETJENBLACK EC-600JD, Akzo Nobel) having a surface area of approximately 1,400 m²/g BET (Product Data Sheet for KETJEN-BLACK EC-600JD, Akzo Nobel) and a pore volume of 4.07 cc/g (as measured by the BJH method) is placed in a 30 ml glass vial and loaded into an autoclave which is charged with approximately 100 grams of elemental sulfur (Sigma Aldrich 84683). The carbon powder is prevented from being in physical contact with the elemental sulfur but the carbon powder has access to sulfur vapor. The autoclave is closed, purged with nitrogen, and then heated to 300° C. for 24 hours under a static atmosphere to develop sulfur vapor. The final sulfur content of the C—S composite is 51 wt. % sulfur.

Jar Milling of C—S Composite:

1.52 g of the C—S composite described above, 43.2 g of ethanol (Sigma Aldrich 459836, St. Louis, Mo.) and 105 g of 5 mm diameter zirconia media is weighted into a 125 mL polyethylene bottle. The bottle is sealed and tumbled end-over-end inside a larger jar on jar mill for 15 hours.

Preparation of Base Composition (C—S Composite/Binder/Carbon Black Formulation):

Polyethylene oxide with average Mw of 600,000 (Sigma Aldrich 182028, St. Louis, Mo.) is dissolved in acetonitrile (Sigma Aldrich 271004, St. Louis, Mo.) to produce a 5.0 wt. % polymer solution. 121 mg of conductive carbon black SUPER C65 (Timcal Ltd.) (BET nitrogen surface area of 62 m²/g measured by ASTM D3037-89) (Technical Data Sheet for SUPER C65, Timcal Ltd.) is dispersed in 3.65 g of the 5.0 wt. % PEO solution, 6.8 g of deionized water and 2 g of ethanol. The slurry is mixed with a magnetic stir bar for 15 minutes to form a SUPER C65/PEO slurry. 36 g of the jar milled suspension of C—S composite described above is added to the SUPER C65/PIB slurry along with 24 g of deionized water. This formulation is stirred for 90 minutes, then mixed for 30 minutes in an ultrasonic bath, and stirred again for 60 minutes.

Spray Coating to Form Base Layering/Electrode:

A base layering/electrode is formed by spraying the formulated ink slurry mixture onto one side of double-sided carbon coated aluminum foil (1 mil, Exopac Advanced Coatings) as a substrate for the base layering/electrode. The dimensions of the coated area on the substrate are approximately 10 cm×10 cm. The ink slurry mixture is sprayed through an air brush (PATRIOT 105, Badger Air-Brush Co.) onto the substrate in a layer by layer pattern. The substrate is heated on a 70° C. hotplate for about 10 seconds following the application of every 4 layers to the substrate surface. Once all of the ink slurry mixture is sprayed onto the substrate, the base layering/electrode is placed in a vacuum at a temperature of 70° C. for a period of 5 minutes.

Preparation of Hydrocarbon Ionomer Solution:

A 6 wt. % solution is prepared by dissolving the SURLYN® polymer in water at approximately 70° C. with mild stirring. The dispersion is then passed through a column of DOWEX® (Dow50WX8-200, Midland, Mich.) ion exchange resin which had been exchanged with lithium ions. The polymer concentration in the eluate solution is approximately 2.5 wt. %. The dispersion is further diluted to 1.25 wt. % with ethanol.

Hydrocarbon Ionomer (SURLYN®) Spray Coating Forming Final Layering/Electrode:

The base layering/electrode described above is cut into a smaller section of 3.2 cm×4.6 cm in size. This piece is fixed to a glass plate with adhesive tape and then heated to about 70° C. on a hot plate. The piece is then sprayed with the hydrocarbon ionomer solution using an air brush and dried on the hot plate for 10-15 seconds following each application of hydrocarbon ionomer solution. The piece is sprayed until the loading of dry SURLYN® hydrocarbon ionomer is 0.3 mg/cm² of base electrode surface area sprayed. The formed final layering/electrode sample is further dried in a vacuum oven at 70° C. for 15 minutes. The dried electrode is calendared between two steel rollers on a custom built device to a final thickness of about 1 mil.

Preparation of Electrolyte:

2.87 grams of lithium bis(trifluoro-methane sulfonyl)imide (LiTFSI, Novolyte) is combined with 10 milliters of 1,2 dimethoxyethane (glyme, Sigma Aldrich, 259527) to create a 0.9 M electrolyte solution.

Preparation of Coin Cell:

A coin cell 300 is prepared using the final layering/electrode described above as the positive electrode 307 for testing. A 14.29 mm diameter circular disk is punched from the final layering/electrode and used as the positive electrode 307. The final weight of the electrode (14.29 mm in diameter, subtracting the weight of the aluminum current collector) is 4.3 mg. This corresponds to a calculated weight of 1.76 mg of elemental sulfur on the electrode.

The coin cell 300 includes the positive electrode 307, a 19 mm diameter circular disk is punched from a CELGARD 2325 (Celgard, LLC) sheet to form porous separator 306. The positive electrode 307, the separator 306, a lithium foil negative electrode 304 (Chemetall Foote Corp.) and a few electrolyte drops 305 of the nonaqueous electrolyte is sandwiched in a HOHSEN 2032 stainless steel coin cell can with a 1 mil thick stainless steel spacer disk and wave spring (Hohsen Corp.). The construction involves the following sequence as shown in FIG. 3: bottom cap 308, positive electrode 307, electrolyte drops 305, porous separator 306, electrolyte drops 305, negative electrode 304, spacer disk 303, wave spring 302 and top cap 301. The final assembly is crimped with an MTI crimper (MTI).

Electrochemical Testing Conditions:

The positive electrode 307 is cycled at room temperature between 1.5 and 3.0 V (vs. Li/Li⁰) at C/5 (based on 1675 mAh/g S for the charge capacity of elemental sulfur). This is equivalent to a current of 335 mAh/g S in the positive electrode 307.

Electrochemical Evaluation:

The maximum discharge capacity measured on discharge at cycle 10 is 827 mAh/g S with a coulombic efficiency of 80.2%.

Example 2

Example 1 describes the preparation and electrochemical evaluation of a layering/electrode including a hydrocarbon ionomer which is a lithium-exchanged derivative of SURLYN®, a copolymer of ethylene and methacrylate. The final layering/electrode in example 2 is prepared similar to the preparation described in example 1 above; except the final layering/electrode is calendared at a higher temperature before the cell is assembled.

Preparation of C—S Composite:

Approximately 1.0 g of carbon powder (KETJENBLACK EC-600JD, Akzo Nobel) having a surface area of approximately 1,400 m²/g BET (Product Data Sheet for KETJENBLACK EC-600JD, Akzo Nobel) and a pore volume of 4.07 cc/g (as measured by the BJH method) is placed in a 30 ml glass vial and loaded into an autoclave which is charged with approximately 100 grams of elemental sulfur (Sigma Aldrich 84683). The carbon powder is prevented from being in physical contact with the elemental sulfur but the carbon powder has access to sulfur vapor. The autoclave is closed, purged with nitrogen, and then heated to 300° C. for 24 hours under a static atmosphere to develop sulfur vapor. The final sulfur content of the C—S composite is 51 wt. % sulfur.

Jar Milling of C—S Composite:

1.52 g of the C—S composite described above, 43.2 g of ethanol (Sigma Aldrich 459836, St. Louis, Mo.) and 105 g of 5 mm diameter zirconia media is weighted into a 125 mL polyethylene bottle. The bottle is sealed and tumbled end-over-end inside a larger jar on jar mill for 15 hours.

Preparation of Base Composition (C—S Composite/Binder/Carbon Black Formulation):

Polyethylene oxide with average Mw of 600,000 (Sigma Aldrich 182028, St. Louis, Mo.) is dissolved in acetonitrile (Sigma Aldrich 271004, St. Louis, Mo.) to produce a 5.0 wt. % polymer solution. 121 mg of conductive carbon black SUPER C65 (Timcal Ltd.) (BET nitrogen surface area of 62 m²/g measured by ASTM D3037-89) (Technical Data Sheet for SUPER C65, Timcal Ltd.) is dispersed in 3.65 g of the 5.0 wt. % PEO solution, 6.8 g of deionized water and 2 g of ethanol. The slurry is mixed with a magnetic stir bar for 15 minutes to form a SUPER C65/PEO slurry. 36 g of the jar milled suspension of C—S composite described above is added to the SUPER C65/PIB slurry along with 24 g of deionized water. This formulation is stirred for 90 minutes, then mixed for 30 minutes in an ultrasonic bath, and stirred again for 60 minutes.

Spray Coating to Form Base Layering/Electrode:

A base layering/electrode is formed by spraying the formulated ink slurry mixture onto one side of double-sided carbon coated aluminum foil (1 mil, Exopac Advanced Coatings) as a substrate for the base layering/electrode. The dimensions of the coated area on the substrate are approximately 10 cm×10 cm. The ink slurry mixture is sprayed through an air brush (PATRIOT 105, Badger Air-Brush Co.) onto the substrate in a layer by layer pattern. The substrate is heated on a 70° C. hotplate for about 10 seconds following the application of every 4 layers to the substrate surface. Once all of the ink slurry mixture is sprayed onto the substrate, the base layering/electrode is placed in a vacuum at a temperature of 70° C. for a period of 5 minutes.

Preparation of Hydrocarbon Ionomer Solution:

A 6 wt. % solution is prepared by dissolving the SURLYN® polymer in water at approximately 70° C. with mild stirring. The dispersion is then passed through a column of DOWEX® (Dow50WX8-200, Midland, Mich.) ion exchange resin which had been exchanged with lithium ions. The polymer concentration in the eluate solution is approximately 2.5 wt. %. The dispersion is further diluted to 1.25 wt. % with ethanol.

Hydrocarbon Ionomer (SURLYN®) Spray Coating Forming Final Layering/Electrode:

The base layering/electrode described above is cut into a smaller section of 3.2 cm×4.6 cm in size. This piece is fixed to a glass plate with adhesive tape and then heated to about 70° C. on a hot plate. The piece is then sprayed with the hydrocarbon ionomer solution using an air brush and dried on the hot plate for 10-15 seconds following each application of hydrocarbon ionomer solution. The piece is sprayed until the loading of dry SURLYN® hydrocarbon ionomer is 0.3 mg/cm$^2$ of base electrode surface area sprayed. The formed final layering/electrode sample is further dried in a vacuum oven at 70° C. for 15 minutes. The dried electrode is calendared between two steel rollers on a custom built device to a final thickness of about 1 mil on a custom-built calendaring device. The sample is sandwiched between pieces of KAPTON® polyimide film. The temperature of the rollers is maintained at 70° C.

Preparation of Electrolyte:

2.87 grams of lithium bis(trifluoro-methane sulfonyl)imide (LiTFSI, Novolyte) is combined with 10 milliters of 1,2 dimethoxyethane (glyme, Sigma Aldrich, 259527) to create a 0.9 M electrolyte solution.

Preparation of Coin Cell:

A coin cell 300 is prepared using the final layering/electrode described above as the positive electrode 307 for testing. A 14.29 mm diameter circular disk is punched from the final layering/electrode and used as the positive electrode 307. The final weight of the electrode (14.29 mm in diameter, subtracting the weight of the aluminum current collector) is 4.1 mg. This corresponds to a calculated weight of 1.68 mg of elemental sulfur on the electrode.

The coin cell 300 includes the positive electrode 307, a 19 mm diameter circular disk is punched from a CELGARD 2325 (Celgard, LLC) sheet to form porous separator 306. The positive electrode 307, the separator 306, a lithium foil negative electrode 304 (Chemetall Foote Corp.) and a few electrolyte drops 305 of the nonaqueous electrolyte is sandwiched in a HOHSEN 2032 stainless steel coin cell can with a 1 mil thick stainless steel spacer disk and wave spring (Hohsen Corp.). The construction involves the following sequence as shown in FIG. 3: bottom cap 308, positive electrode 307, electrolyte drops 305, porous separator 306, electrolyte drops 305, negative electrode 304, spacer disk 303, wave spring 302 and top cap 301. The final assembly is crimped with an MTI crimper (MTI).

Electrochemical Testing Conditions:

The positive electrode 307 is cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:

The maximum discharge capacity measured on discharge at cycle 10 is 855 mAh/g S with a coulombic efficiency of 83%.

Comparative Example A

Comparative example A describes the preparation and electrochemical evaluation of a layering/electrode without any hydrocarbon ionomer for comparison with examples 1 and 2 above. The base layering/electrode in comparative example A is not coated with hydrocarbon ionomer, but is otherwise prepared in a manner similar to the preparation described in example 1 and 2 above.

Preparation of C—S Composite:

Approximately 1.0 g of carbon powder (KETJENBLACK EC-600JD, Akzo Nobel) having a surface area of approximately 1400 m$^2$/g BET (Product Data Sheet for KETJENBLACK EC-600JD, Akzo Nobel) and a pore volume of 4.07 cc/g (as measured by the BJH method) is placed in a 30 ml glass vial and loaded into an autoclave which is charged with approximately 100 grams of elemental sulfur (Sigma Aldrich 84683). The carbon powder is prevented from being in physical contact with the elemental sulfur but the carbon powder has access to sulfur vapor. The autoclave is closed, purged with nitrogen, and then heated to 300° C. for 24 hours under a static atmosphere to develop sulfur vapor. The final sulfur content of the C—S composite is 51 wt. % sulfur.

Jar Milling of C—S Composite:

1.52 g of the C—S composite described above, 43.2 g of ethanol (Sigma Aldrich 459836, St. Louis, Mo.) and 105 g of 5 mm diameter zirconia media is weighted into a 125 mL polyethylene bottle. The bottle is sealed and tumbled end-over-end inside a larger jar on jar mill for 15 hours.

Preparation of Base Composition (C—S Composite/Binder/Carbon Black Formulation):

Polyethylene oxide with average Mw of 600,000 (Sigma Aldrich, 182028) is dissolved in acetonitrile (Sigma Aldrich, 271004) to produce a 5.0 wt. % polymer solution. 121 mg of conductive carbon black SUPER C65 (Timcal Ltd.) (BET nitrogen surface area of 62 m$^2$/g measured by ASTM D3037-89) (Technical Data Sheet for SUPER C65, Timcal Ltd.) is dispersed in 3.65 g of the 5.0 wt. % PEO solution, 6.8 g of deionized water and 2 g of ethanol. The slurry is mixed with a magnetic stir bar for 15 minutes to form a SUPER C65/PEO slurry. 36 g of the jar milled suspension of C—S composite described above is added to the SUPER C65/PIB slurry along with 24 g of deionized water. This formulation is stirred for 90 minutes, then mixed for 30 minutes in an ultrasonic bath, and stirred again for 60 minutes.

Spray Coating to Form Base Layering/Electrode:

A base layering/electrode is formed by spraying the formulated ink slurry mixture onto one side of double-sided carbon coated aluminum foil (1 mil, Exopac Advanced Coatings) as a substrate for the base layering/electrode. The dimensions of the coated area on the substrate are approximately 10 cm×10 cm. The ink slurry mixture is sprayed through an air brush (PATRIOT 105, Badger Air-Brush Co.)

onto the substrate in a layer by layer pattern. The substrate is heated on a 70° C. hotplate for about 10 seconds following the application of every 4 layers to the substrate surface. Once all of the ink slurry mixture is sprayed onto the substrate, the base layering/electrode is placed in a vacuum at a temperature of 70° C. for a period of 5 minutes. The dried electrode is calendared between two steel rollers on a custom built device to a final thickness of about 1 mil on a custom-built calendaring device.

Preparation of Hydrocarbon Ionomer Solution:
None.

Hydrocarbon Ionomer (SURLYN®) Spray Coating Forming Final Layering/Electrode:
None.

Preparation of Electrolyte:
2.87 grams of lithium bis(trifluoro-methane sulfonyl)imide (LiTFSI, Novolyte) is combined with 10 milliters of 1,2 dimethoxyethane (glyme, Sigma Aldrich, 259527) to create a 0.9 M electrolyte solution.

Preparation of Coin Cell:
A coin cell 300 is prepared using the final layering/electrode described above as the positive electrode 307 for testing. A 14.29 mm diameter circular disk is punched from the final layering/electrode and used as the positive electrode 307. The final weight of the electrode (14.29 mm in diameter, subtracting the weight of the aluminum current collector) is 4.1 mg. This corresponds to a calculated weight of 1.68 mg of elemental sulfur on the electrode.

The coin cell 300 includes the positive electrode 307, a 19 mm diameter circular disk is punched from a CELGARD 2325 (Celgard, LLC) sheet to form porous separator 306. The positive electrode 307, the separator 306 (used as received and not soaked in glyme prior to assembling the coin cell 300), a lithium foil negative electrode 304 (Chemetall Foote Corp.) and a few electrolyte drops 305 of the nonaqueous electrolyte is sandwiched in a HOHSEN 2032 stainless steel coin cell can with a 1 mil thick stainless steel spacer disk and wave spring (Hohsen Corp.). The construction involves the following sequence as shown in FIG. 3: bottom cap 308, positive electrode 307, electrolyte drops 305, porous separator 306, electrolyte drops 305, negative electrode 304, spacer disk 303, wave spring 302 and top cap 301. The final assembly is crimped with an MTI crimper (MTI).

Electrochemical Testing Conditions:
The positive electrode 307 is cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:
The maximum discharge capacity measured on discharge at cycle 10 is 1,056 mAh/g S with a coulombic efficiency of 51.3%.

Example 3

Example 3 describes the preparation and electrochemical evaluation of a layering/electrode including a hydrocarbon ionomer which is a lithium exchanged derivative of a sodium salt of polyvinyl sulfonic acid (PVSA) (Sigma Aldrich, 278424). The final layering/electrode is prepared from a spray coated base layering/electrode incorporating a base composition. The base composition includes KETJEN-BLACK 600 (high surface area, high pore volume carbon) C—S composite, polyisobutylene (PIB) binder and low surface area conductive carbon black. The base layering/electrode is sprayed with a hydrocarbon ionomer solution of lithium exchanged PVSA to form the final layering/electrode. In the final layering/electrode, the hydrocarbon ionomer is predominantly located at the outer surface away from the supporting substrate.

Preparation of C—S Composite:
Approximately 1.0 g of carbon powder (KETJENBLACK EC-600JD, Akzo Nobel) having a surface area of approximately 1,400 m$^2$/g BET (Product Data Sheet for KETJEN-BLACK EC-600JD, Akzo Nobel) and a pore volume of 4.07 cc/g (as measured by the BJH method) is placed in a 30 ml glass vial and loaded into an autoclave which is charged with approximately 100 grams of elemental sulfur (Sigma Aldrich 84683). The carbon powder is prevented from being in physical contact with the elemental sulfur but the carbon powder has access to sulfur vapor. The autoclave is closed, purged with nitrogen, and then heated to 300° C. for 24 hours under a static atmosphere to develop sulfur vapor. The final sulfur content of the C—S composite is 51 wt. % sulfur.

Jar Milling of C—S Composite:
1.8 g of the C—S composite described above, 51 g of toluene (EMD Chemicals) and 120 g of 5 mm diameter zirconia media is weighted into a 125 mL polyethylene bottle. The bottle is sealed and tumbled end-over-end inside a larger jar on jar mill for 15 hours.

Preparation of Base Composition (C—S Composite/Binder/Carbon Black Formulation):
Polyisobutylene with average Mw of 4,200,000 (Sigma Aldrich, 181498) is dissolved in toluene to produce a 2.0 wt. % polymer solution. 153 mg of conductive carbon black SUPER C65 (Timcal Ltd.) (BET nitrogen surface area of 62 m$^2$/g measured by ASTM D3037-89) (Technical Data Sheet for SUPER C65, Timcal Ltd.) is dispersed in 11.4 g of the 2.0 wt. % PIB solution. 45 g of the jar milled suspension of C—S composite described above is added to the SUPER C65/PIB slurry along with 27 g of toluene to form an ink slurry with about 2 wt. % solid loading. This ink is stirred for 3 hours.

Spray Coating to Form Base Layering/Electrode:
A base layering/electrode is formed by spraying the formulated ink slurry onto one side of double-sided carbon coated aluminum foil (1 mil, Exopac Advanced Coatings) as a substrate for the base layering/electrode. The dimensions of the coated area on the substrate are approximately 10 cm×10 cm. The ink slurry is sprayed through an air brush (PATRIOT 105, Badger Air-Brush Co.) onto the substrate in a layer by layer pattern. The substrate is heated on a 70° C. hotplate for about 10 seconds following the application of every 4 layers to the substrate surface. Once all of the ink slurry is sprayed onto the substrate, the base layering/electrode is placed in a vacuum at a temperature of 70° C. for a period of 5 minutes.

Preparation of Hydrocarbon Ionomer (PVSA) Solution:
A 25 wt. % dispersion of polyvinylsulfonic acid (PVSA) sodium salt (Sigma Aldrich, 278424) is passed through a column of DOWEX® (Dow 50WX8-200) ion exchange resin which had been exchanged with lithium ions. The polymer concentration in the eluate solution is 2.5 wt. %. Following this procedure, the dispersion is diluted to 1.25 wt. % using ethanol.

Hydrocarbon Ionomer (PVSA) Spray Coating Forming Final Layering/Electrode:
The base layering/electrode described above is cut into a smaller section of 3.2 cm×4.6 cm in size. This piece is fixed to a glass plate with adhesive tape and then heated to about 70° C. on a hot plate. The piece is then sprayed with the hydrocarbon ionomer solution using an air brush and dried on the hot plate for 10-15 seconds following each application of hydrocarbon ionomer solution. The piece is sprayed until the loading of dry PVSA hydrocarbon ionomer is 0.7 mg/cm2 of base electrode surface area sprayed. The formed final layering/electrode sample is further dried in a vacuum oven at 70° C. for 15 minutes.

Preparation of Electrolyte:

2.87 grams of lithium bis(trifluoro-methane sulfonyl)imide (LiTFSI, Novolyte) is combined with 10 milliters of 1,2 dimethoxyethane (glyme, Sigma Aldrich, 259527) to create a 0.9 M electrolyte solution.

Preparation of Coin Cell:

A coin cell 300 is prepared using the final layering/electrode described above as the positive electrode 307 for testing. A 14.29 mm diameter circular disk is punched from the final layering/electrode and used as the positive electrode 307. The final weight of the electrode (14.29 mm in diameter, subtracting the weight of the aluminum current collector) is 5.7 mg. This corresponds to a calculated weight of 2.34 mg of elemental sulfur on the electrode.

The coin cell 300 includes the positive electrode 307, a 19 mm diameter circular disk is punched from a CELGARD 2325 (Celgard, LLC) sheet to form porous separator 306. The positive electrode 307, the separator 306, a lithium foil negative electrode 304 (Chemetall Foote Corp.) and a few electrolyte drops 305 of the nonaqueous electrolyte is sandwiched in a HOHSEN 2032 stainless steel coin cell can with a 1 mil thick stainless steel spacer disk and wave spring (Hohsen Corp.). The construction involves the following sequence as shown in FIG. 3: bottom cap 308, positive electrode 307, electrolyte drops 305, porous separator 306, electrolyte drops 305, negative electrode 304, spacer disk 303, wave spring 302 and top cap 301. The final assembly is crimped with an MTI crimper (MTI).

Electrochemical Testing Conditions:

The positive electrode 307 is cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:

The maximum discharge capacity measured on discharge at cycle 10 is 900 mAh/g S with a coulombic efficiency of 83.6%.

Example 4

Example 4 describes the preparation and electrochemical evaluation of a layering/electrode including a hydrocarbon ionomer which is a lithium exchanged sulfonated derivative (SPEEK) of a poly(ether ether ketone) PEEK (Victrex, 150P, Lancashire, UK). The base composition includes KETJENBLACK 600 (high surface area, high pore volume carbon) C—S composite, polyisobutylene (PIB) binder and low surface area conductive carbon black. The base layering/electrode is sprayed with a hydrocarbon ionomer solution of lithium exchanged SPEEK to form the final layering/electrode. In the final layering/electrode, the hydrocarbon ionomer is predominantly located at the outer surface away from the supporting substrate.

Preparation of C—S Composite:

Approximately 1.0 g of carbon powder (KETJENBLACK EC-600JD, Akzo Nobel) having a surface area of approximately 1,400 m$^2$/g BET (Product Data Sheet for KETJENBLACK EC-600JD, Akzo Nobel) and a pore volume of 4.07 cc/g (as measured by the BJH method) is placed in a 30 ml glass vial and loaded into an autoclave which is charged with approximately 100 grams of elemental sulfur (Sigma Aldrich, 84683). The carbon powder is prevented from being in physical contact with the elemental sulfur but the carbon powder has access to sulfur vapor. The autoclave is closed, purged with nitrogen, and then heated to 300° C. for 24 hours under a static atmosphere to develop sulfur vapor. The final sulfur content of the C—S composite is 51 wt. % sulfur.

Jar Milling of C—S Composite:

1.8 g of the C—S composite described above, 51 g of toluene (EMD Chemicals) and 120 g of 5 mm diameter zirconia media is weighted into a 125 mL polyethylene bottle. The bottle is sealed and tumbled end-over-end inside a larger jar on jar mill for 15 hours.

Preparation of Base Composition (C—S Composite/Binder/Carbon Black Formulation):

Polyisobutylene with average Mw of 4,200,000 (Sigma Aldrich, 181498) is dissolved in toluene to produce a 2.0 wt. % polymer solution. 153 mg of conductive carbon black SUPER C65 (Timcal Ltd.) (BET nitrogen surface area of 62 m$^2$/g measured by ASTM D3037-89) (Technical Data Sheet for SUPER C65, Timcal Ltd.) is dispersed in 11.4 g of the 2.0 wt. % PIB solution. 45 g of the jar milled suspension of C—S composite described above is added to the SUPER C65/PIB slurry along with 27 g of toluene to form an ink slurry with about 2 wt. % solid loading. This ink is stirred for 3 hours.

Spray Coating to Form Base Layering/Electrode:

A base layering/electrode is formed by spraying the formulated ink slurry onto one side of double-sided carbon coated aluminum foil (1 mil, Exopac Advanced Coatings) as a substrate for the base layering/electrode. The dimensions of the coated area on the substrate are approximately 10 cm×10 cm. The ink slurry is sprayed through an air brush (PATRIOT 105, Badger Air-Brush Co.) onto the substrate in a layer by layer pattern. The substrate is heated on a 70° C. hotplate for about 10 seconds following the application of every 4 layers to the substrate surface. Once all of the ink slurry is sprayed onto the substrate, the base layering/electrode is placed in a vacuum at a temperature of 70° C. for a period of 5 minutes.

Sulfonation of PEEK with Lithium Ion Exchange Forming SPEEK:

5.0 g of PEEK (Victrex, 150P, Lancashire, UK) is dissolved in 176 g of concentrated sulfuric acid, and stirred rapidly for six days at room temperature. The polymer is precipitated from solution in ice water, then filtered and rinsed with deionized water until the filtrate pH reached 4. The polymer is exchanged with lithium ions by stirring in a bath of 2 M lithium hydroxide. The solution is filtered and the polymer is rinsed with deionized water until the filtrate is pH neutral. Finally the polymer is dried in a 70° C. vacuum oven overnight.

Preparation of Hydrocarbon Ionomer (SPEEK) Solution:

Lithium-exchanged SPEEK is dissolved in dimethylacetimide (DMAc) (Sigma Aldrich, 271012) to create a 5 wt. % concentration.

Hydrocarbon Ionomer (SPEEK) Spray Coating Forming Final Layering/Electrode:

The base layering/electrode described above is cut into a smaller section of 3.2 cm×4.6 cm in size. This piece is fixed to a glass plate with adhesive tape and then heated to about 70° C. on a hot plate. The piece is then sprayed with the hydrocarbon ionomer solution using an air brush and dried on the hot plate for 10-15 seconds following each application of hydrocarbon ionomer solution. The piece is sprayed until the loading of dry SPEEK hydrocarbon ionomer is 0.2 mg/cm$^2$ of base electrode surface area sprayed. The formed final layering/electrode sample is further dried in a vacuum oven at 70° C. for 15 minutes.

Preparation of Electrolyte:

2.87 grams of lithium bis(trifluoro-methane sulfonyl)imide (LiTFSI, Novolyte) is combined with 10 milliters of 1,2 dimethoxyethane (glyme, Sigma Aldrich, 259527) to create a 0.9 M electrolyte solution.

Preparation of Coin Cell:

A coin cell 300 is prepared using the final layering/electrode described above as the positive electrode 307 for testing. A 14.29 mm diameter circular disk is punched from the final layering/electrode and used as the positive electrode 307. The final weight of the electrode (14.29 mm in diameter, subtracting the weight of the aluminum current collector) is 4.9 mg. This corresponds to a calculated weight of 2.01 mg of elemental sulfur on the electrode.

The coin cell 300 includes the positive electrode 307, a 19 mm diameter circular disk is punched from a CELGARD 2325 (Celgard, LLC) sheet to form porous separator 306. The positive electrode 307, the separator 306, a lithium foil negative electrode 304 (Chemetall Foote Corp.) and a few electrolyte drops 305 of the nonaqueous electrolyte is sandwiched in a HOHSEN 2032 stainless steel coin cell can with a 1 mil thick stainless steel spacer disk and wave spring (Hohsen Corp.). The construction involves the following sequence as shown in FIG. 3: bottom cap 308, positive electrode 307, electrolyte drops 305, porous separator 306, electrolyte drops 305, negative electrode 304, spacer disk 303, wave spring 302 and top cap 301. The final assembly is crimped with an MTI crimper (MTI).

Electrochemical Testing Conditions:

The positive electrode 307 is cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:

The maximum discharge capacity measured on discharge at cycle 10 is 945 mAh/g S with a coulombic efficiency of 80%.

Comparative Example B

Comparative example B describes the preparation and electrochemical evaluation of a layering/electrode without any hydrocarbon ionomer for comparison with examples 3 and 4 above. The base layering/electrode in comparative example B is not coated with hydrocarbon ionomer, but is otherwise prepared in a manner similar to the preparation described in example 1 and 2 above.

Preparation of C—S Composite:

Approximately 1.0 g of carbon powder (KETJENBLACK EC-600JD, Akzo Nobel) having a surface area of approximately 1,400 m$^2$/g BET (Product Data Sheet for KETJENBLACK EC-600JD, Akzo Nobel) and a pore volume of 4.07 cc/g (as measured by the BJH method) is placed in a 30 ml glass vial and loaded into an autoclave which is charged with approximately 100 grams of elemental sulfur (Sigma Aldrich, 84683). The carbon powder is prevented from being in physical contact with the elemental sulfur but the carbon powder has access to sulfur vapor. The autoclave is closed, purged with nitrogen, and then heated to 300° C. for 24 hours under a static atmosphere to develop sulfur vapor. The final sulfur content of the C—S composite is 51 wt. % sulfur.

Jar Milling of C—S Composite:

1.8 g of the C—S composite described above, 51 g of toluene (EMD Chemicals) and 120 g of 5 mm diameter zirconia media is weighted into a 125 mL polyethylene bottle. The bottle is sealed and tumbled end-over-end inside a larger jar on jar mill for 15 hours.

Preparation of Base Composition (C—S Composite/Binder/Carbon Black Formulation):

Polyisobutylene with average Mw of 4,200,000 (Sigma Aldrich, 181498) is dissolved in toluene to produce a 2.0 wt. % polymer solution. 153 mg of conductive carbon black SUPER C65 (Timcal Ltd.) (BET nitrogen surface area of 62 m$^2$/g measured by ASTM D3037-89) (Technical Data Sheet for SUPER C65, Timcal Ltd.) is dispersed in 11.4 g of the 2.0 wt. % PIB solution. 45 g of the jar milled suspension of C—S composite described above is added to the SUPER C65/PIB slurry along with 27 g of toluene to form an ink slurry with about 2 wt. % solid loading. This ink is stirred for 3 hours.

Spray Coating to Form Base Layering/Electrode:

A base layering/electrode is formed by spraying the formulated ink slurry onto one side of double-sided carbon coated aluminum foil (1 mil, Exopac Advanced Coatings) as a substrate for the base layering/electrode. The dimensions of the coated area on the substrate are approximately 10 cm×10 cm. The ink slurry is sprayed through an air brush (PATRIOT 105, Badger Air-Brush Co.) onto the substrate in a layer by layer pattern. The substrate is heated on a 70° C. hotplate for about 10 seconds following the application of every 4 layers to the substrate surface. Once all of the ink slurry is sprayed onto the substrate, the base layering/electrode is placed in a vacuum at a temperature of 70° C. for a period of 5 minutes.

Preparation of Hydrocarbon Ionomer Solution:

None.

Hydrocarbon Ionomer (SURLYN®) Spray Coating Forming Final Layering/Electrode:

None.

Preparation of Electrolyte:

2.87 grams of lithium bis(trifluoro-methane sulfonyl)imide (LiTFSI, Novolyte) is combined with 10 milliters of 1,2 dimethoxyethane (glyme, Sigma Aldrich, 259527) to create a 0.9 M electrolyte solution.

Preparation of Coin Cell:

A coin cell 300 is prepared using the final layering/electrode described above as the positive electrode 307 for testing. A 14.29 mm diameter circular disk is punched from the final layering/electrode and used as the positive electrode 307. The final weight of the electrode (14.29 mm in diameter), subtracting the weight of the aluminum current collector) is 5.2 mg. This corresponds to a calculated weight of 2.09 mg of elemental sulfur on the electrode.

The coin cell 300 includes the positive electrode 307, a 19 mm diameter circular disk is punched from a CELGARD 2325 (Celgard, LLC) sheet to form porous separator 306. The positive electrode 307, the separator 306 (used as received and not soaked in glyme prior to assembling the coin cell 300), a lithium foil negative electrode 304 (Chemetall Foote Corp.) and a few electrolyte drops 305 of the nonaqueous electrolyte is sandwiched in a HOHSEN 2032 stainless steel coin cell can with a 1 mil thick stainless steel spacer disk and wave spring (Hohsen Corp.). The construction involves the following sequence as shown in FIG. 3: bottom cap 308, positive electrode 307, electrolyte drops 305, porous separator 306, electrolyte drops 305, negative electrode 304, spacer disk 303, wave spring 302 and top cap 301. The final assembly is crimped with an MTI crimper (MTI).

Electrochemical Testing Conditions:

The positive electrode 307 is cycled at room temperature between 1.5 and 3.0 V (vs. Li/Li$^0$) at C/5 (based on 1675 mAh/g S for the charge capacity of elemental sulfur). This is equivalent to a current of 335 mAh/g S in the positive electrode 307.

Electrochemical Evaluation:

The maximum discharge capacity measured on discharge at cycle 10 is 1,023 mAh/g S with a coulombic efficiency of 56.5%.

Utilizing the composition 103 including hydrocarbon ionomer in positive electrodes of Li—S cells for Li—S batteries, such as positive electrode 102, provides a high maximum discharge capacity Li—S battery with high coulombic efficiency. Positive electrodes incorporating the composition 103 may be utilized in a broad range of Li—S battery applications in providing a source of potential power for many household and industrial applications. The Li—S batteries with these positive electrodes are especially useful as power sources for small electrical devices such as cellular phones, cameras and portable computing devices and may also be used as power sources for car ignition batteries and for electrified cars.

Although described specifically throughout the entirety of the disclosure, the representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the examples. While the examples have been described with reference to figures and data in the table, those skilled in the art are able to make various modifications to the described examples without departing from the scope of the examples as described in the following claims, and their equivalents.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A layering comprising:
   a plurality of coatings, wherein respective coatings in the plurality of coatings comprise respective compositions based on at least one composition, wherein the respective compositions comprise at least one of
   a hydrocarbon ionomer,
   a carbon-sulfur composite comprising carbon powder containing sulfur compound situated in the carbon microstructure, and
   a component other than hydrocarbon ionomer and carbon-sulfur composite; wherein, said layering comprising a plurality of coatings comprises at least one hydrocarbon ionomer and at least one carbon-sulfur composite comprising carbon powder containing sulfur compound situated in the carbon microstructure.

2. The layering of claim 1, wherein the hydrocarbon ionomer comprises at least one ionic group selected from carboxylate ionic groups.

3. The layering of claim 1 wherein the hydrocarbon ionomer is selected from poly(ethylene-co-(meth)acrylic) acid, polyvinyl sulfonic acid, sulfonated derivatives of a poly(ether ether-ketone), and neutralized forms thereof.

4. The layering of claim 1 wherein the hydrocarbon ionomer is poly(ethylene-co-(meth)acrylic) acid or a neutralized form thereof.

5. The layering of claim 1 wherein the sulfur compound is elemental sulfur, lithium sulfide, and combinations thereof.

6. An electrode comprising:
   a circuit contact; and
   a layering comprising
      a plurality of coatings, wherein respective coatings in the plurality of coatings comprise respective compositions based on at least one composition, wherein the respective compositions comprise at least one of
   a hydrocarbon ionomer,
   a carbon-sulfur composite comprising carbon powder containing sulfur compound situated in the carbon microstructure, and
   a component other than hydrocarbon ionomer and carbon-sulfur composite; wherein, said layering comprising a plurality of coatings comprises at least one hydrocarbon ionomer and at least one carbon-sulfur composite comprising carbon powder containing sulfur compound situated in the carbon microstructure.

7. The electrode of claim 6, wherein the layering is made using a layering process comprising a plurality of coating steps, a coating step in the plurality comprising applying a respective composition of the respective compositions combined with a solvent to a surface.

8. The electrode of claim 6, wherein the hydrocarbon ionomer comprises at least one ionic group selected from carboxylate ionic groups.

* * * * *